(12) United States Patent
Hirota

(10) Patent No.: US 7,961,107 B2
(45) Date of Patent: Jun. 14, 2011

(54) CARTRIDGE FOR INCLUDING AT LEAST RFID TAG AND APPARATUS FOR COMMUNICATING WITH RFID TAG

(75) Inventor: Mitsuo Hirota, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 429 days.

(21) Appl. No.: 12/313,494

(22) Filed: Nov. 19, 2008

(65) Prior Publication Data
US 2009/0160613 A1    Jun. 25, 2009

Related U.S. Application Data

(63) Continuation-in-part of application No. PCT/JP2007/060616, filed on May 24, 2007.

(30) Foreign Application Priority Data

May 26, 2006  (JP) .................................. 2006-146387

(51) Int. Cl.
*G08B 13/14* (2006.01)
(52) U.S. Cl. ................. 340/572.8; 340/572.1; 340/10.1; 340/10.3; 235/487; 235/492; 347/19; 347/50
(58) Field of Classification Search ............... 340/572.1, 340/572.8, 825.69, 825.72, 10.1, 10.3; 235/375, 235/376, 487, 492; 347/19, 50; 400/247, 611
See application file for complete search history.

(56) References Cited

U.S. PATENT DOCUMENTS

| 7,495,559 B2 * | 2/2009 | Nagai et al. ................... 340/10.1 |
| 7,866,561 B2 * | 1/2011 | Tanaka ........................... 235/492 |
| 2004/0141790 A1 | 7/2004 | Waters |
| 2008/0117059 A1 * | 5/2008 | Ohashi et al. ............... 340/572.8 |

FOREIGN PATENT DOCUMENTS

| JP | 2001-331768 | 11/2001 |
| JP | 2004-082432 | 3/2004 |
| JP | 2005-001764 | 1/2005 |
| JP | 2005-141098 | 6/2005 |

* cited by examiner

Primary Examiner — Hung T. Nguyen
(74) Attorney, Agent, or Firm — Day Pitney LLP

(57) ABSTRACT

This disclosure discloses an apparatus for producing RFID label includes: a cartridge holder detachable with respect to a cartridge having a base tape provided with a RFID circuit element provided with an IC circuit part and a tag antenna, a loop antenna configured to transmit/receive information with the RFID circuit element via radio communication, and a cartridge connector configured to supply power to the loop antenna; a tape feeding roller configured to feed the base tape; and an apparatus connector configured to supply power to the cartridge connector.

15 Claims, 19 Drawing Sheets

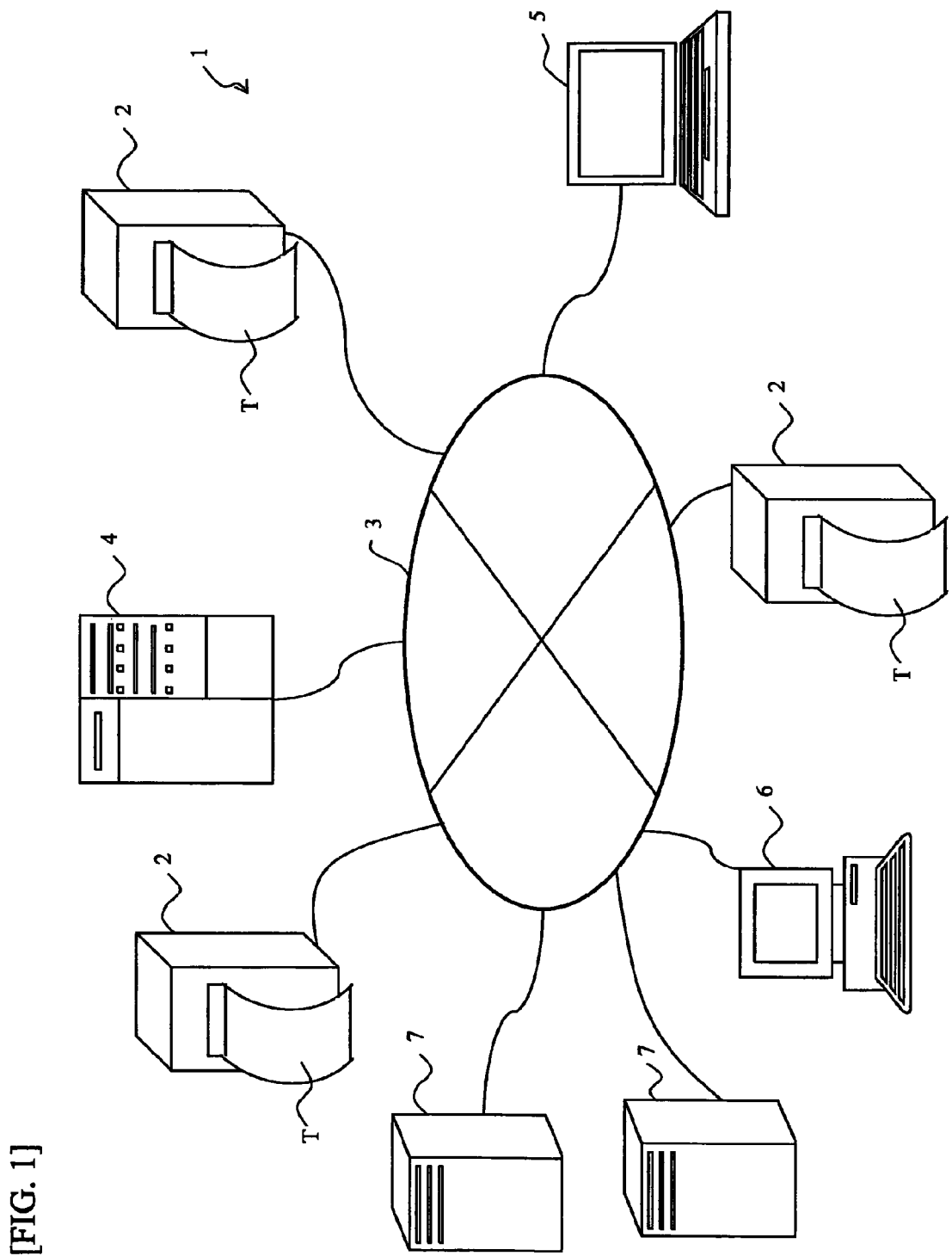
[FIG. 1]

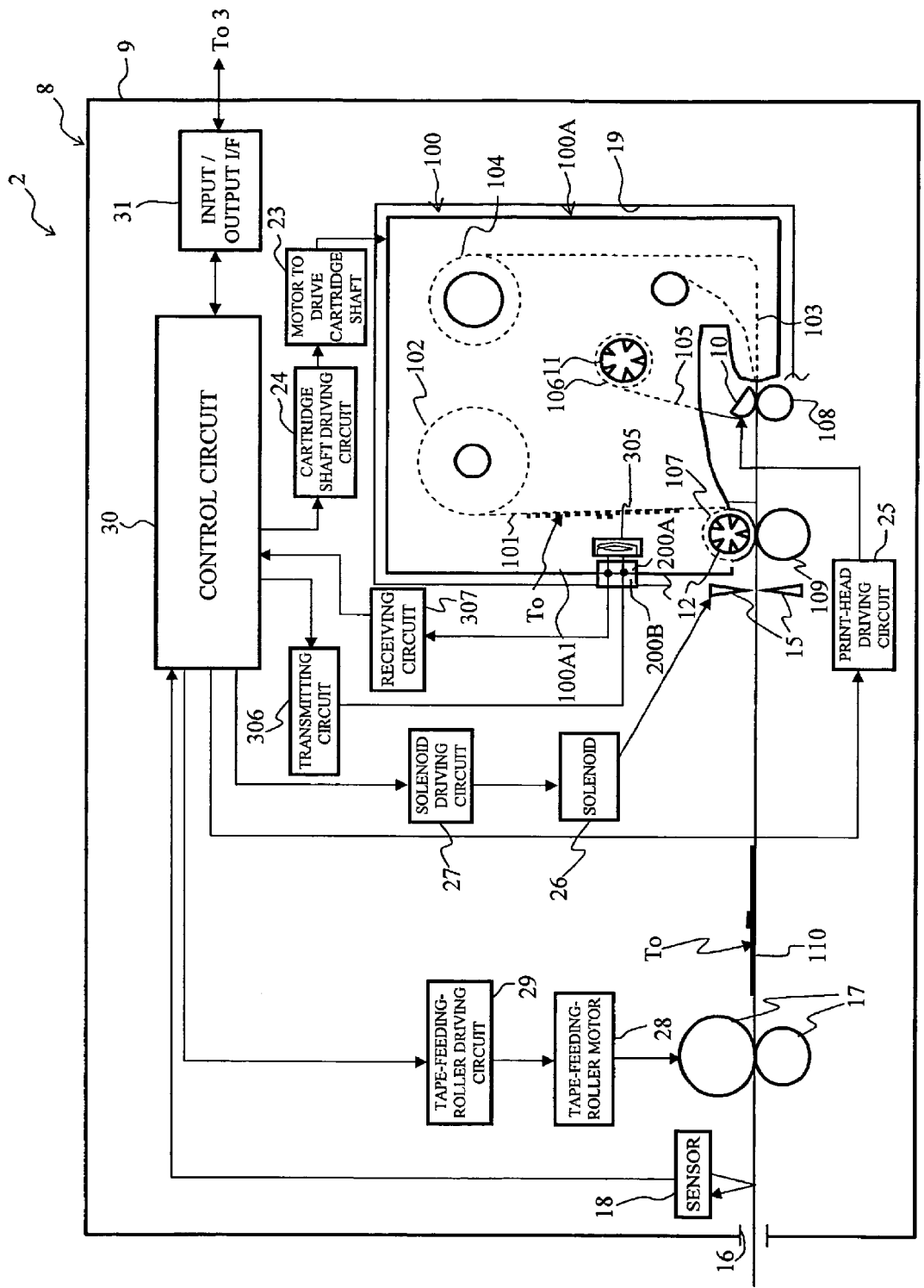
[FIG. 2]

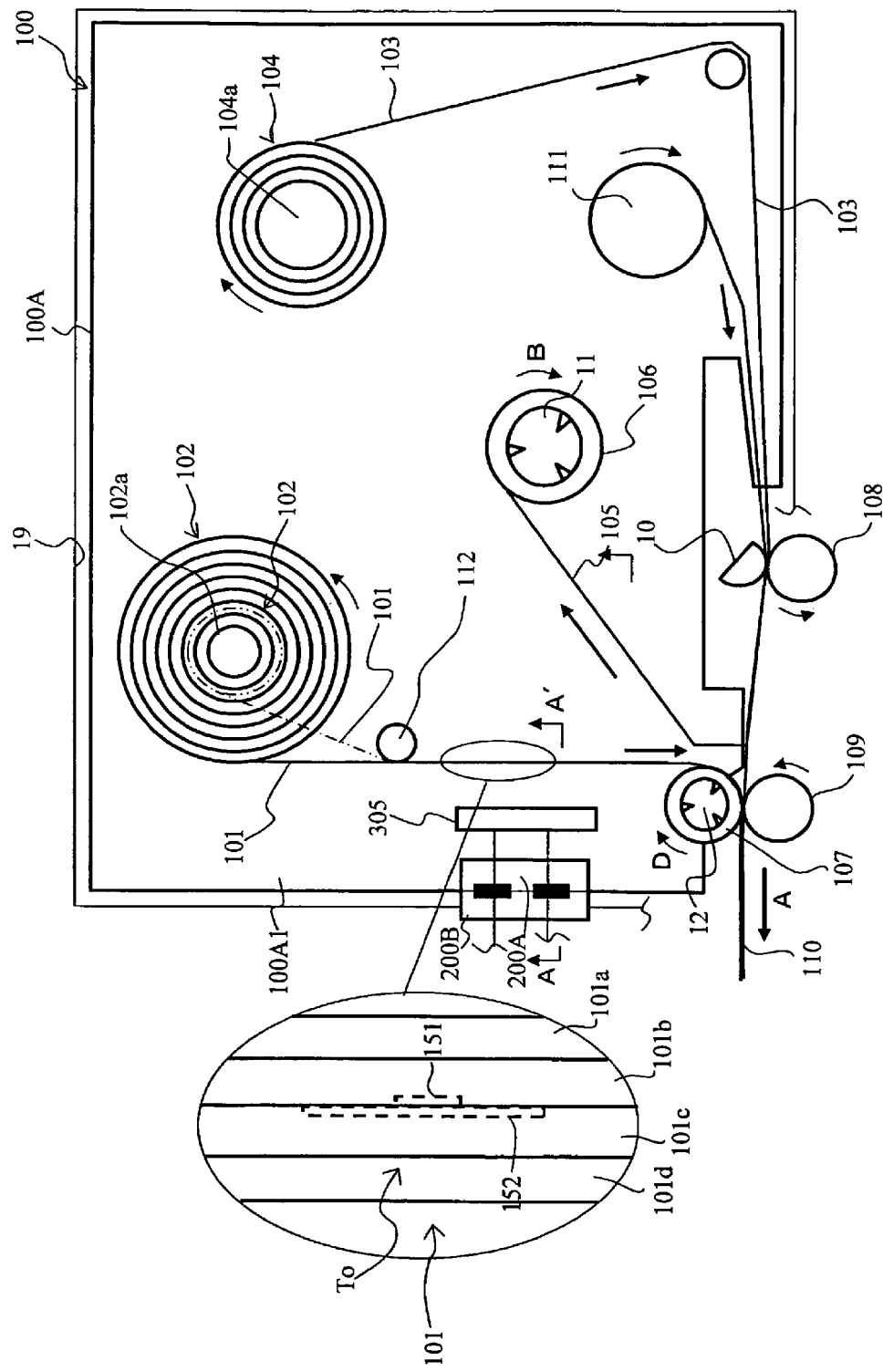
[FIG. 3]

[FIG. 4]
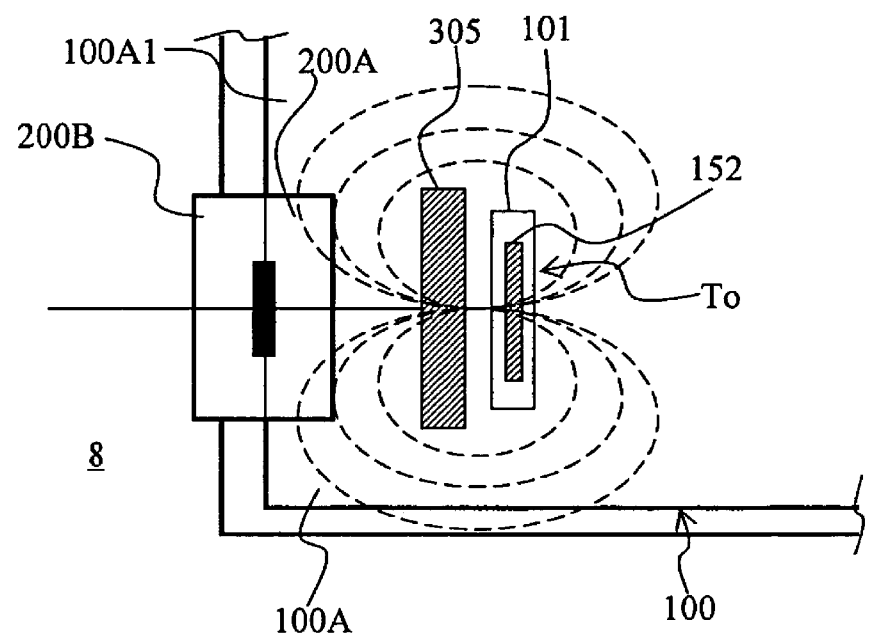

[FIG. 5]
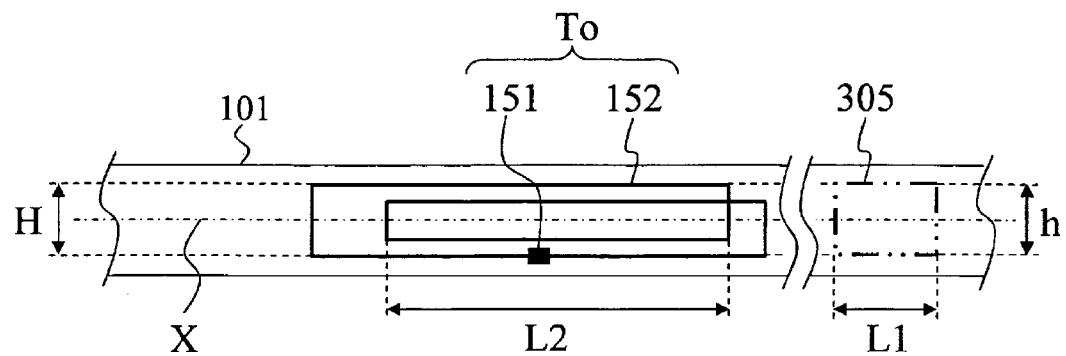
[FIG. 6A]
t=0
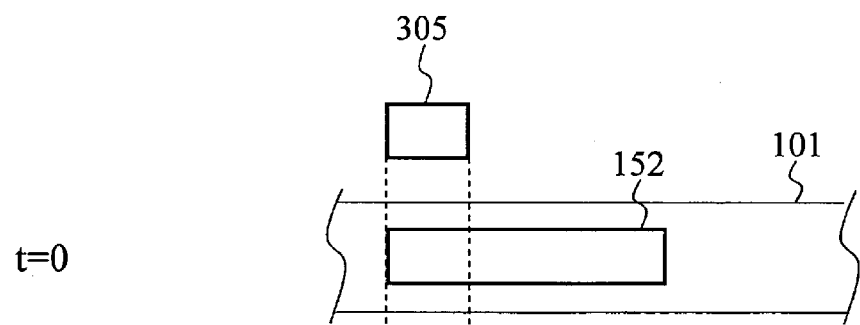
[FIG. 6B]
t=T
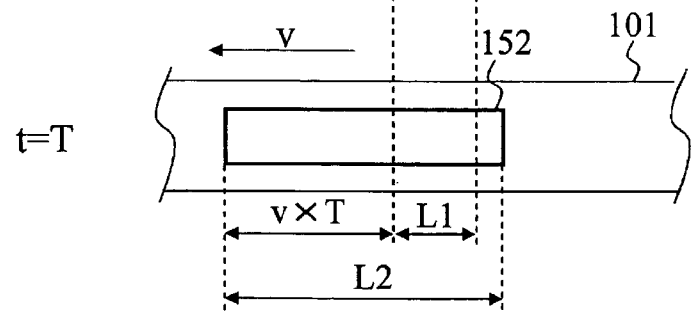

[FIG. 7]
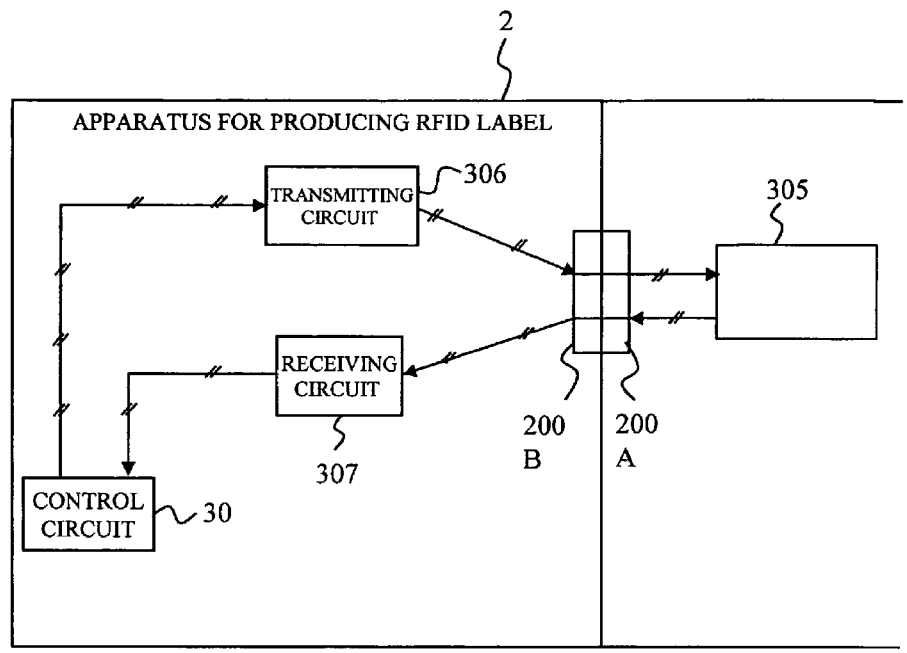
[FIG. 8]
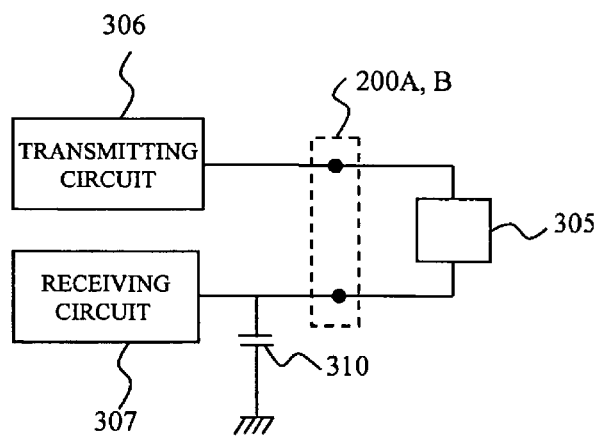

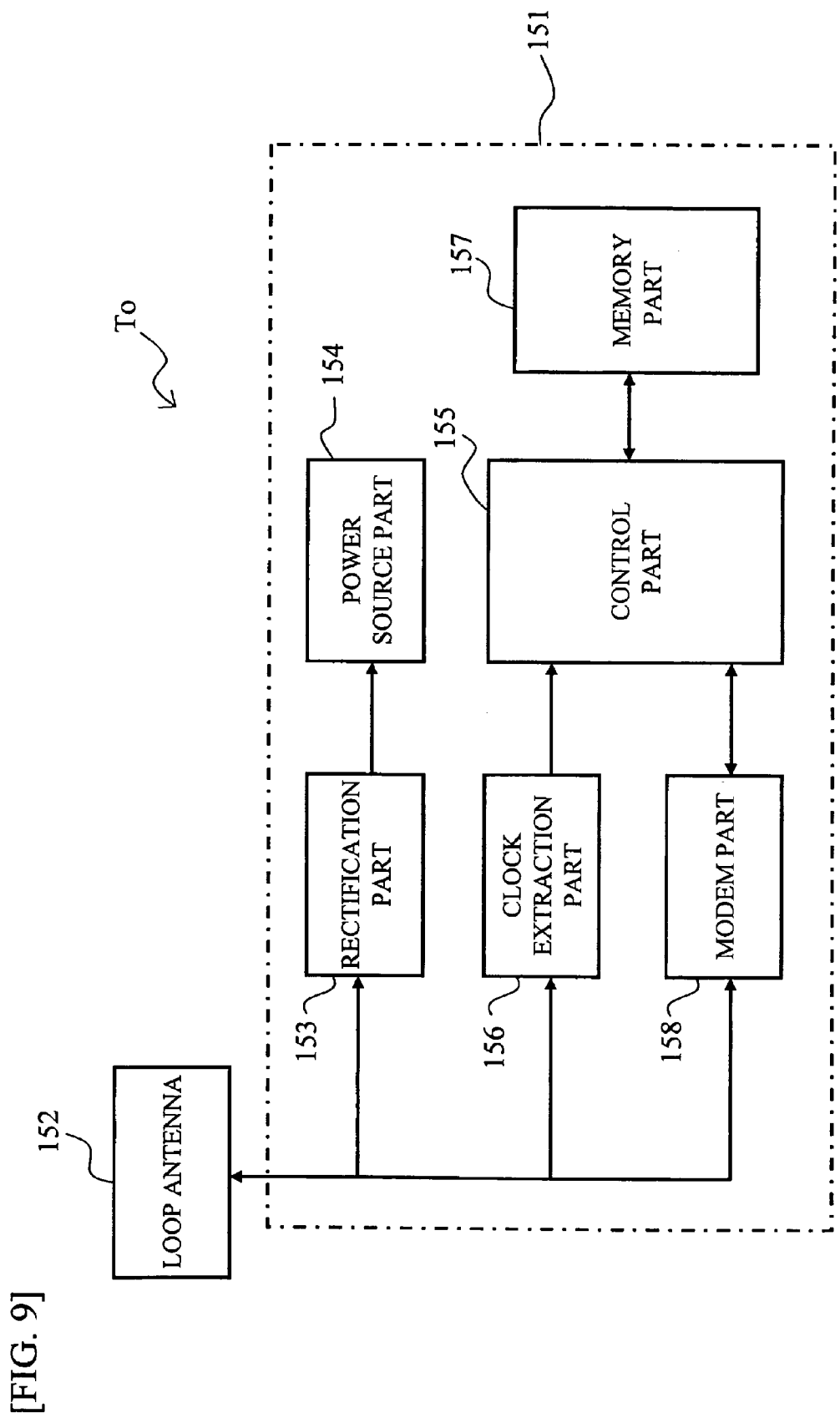
[FIG. 9]

[FIG. 10A]
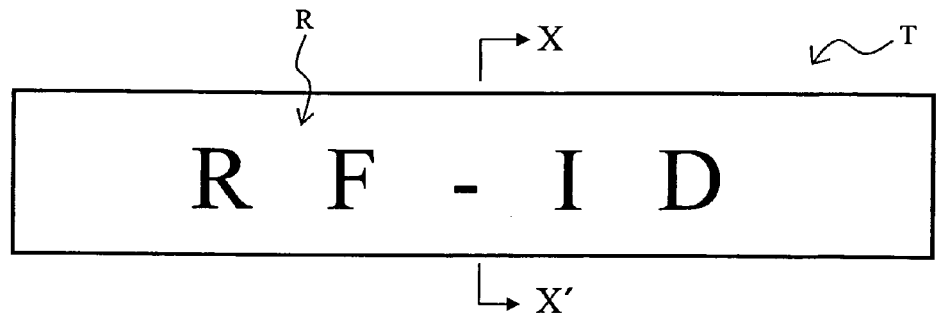
[FIG. 10B]
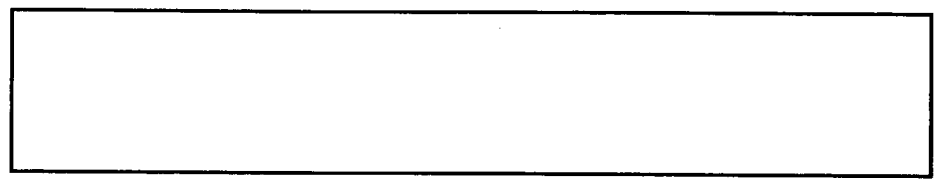
[FIG. 11]
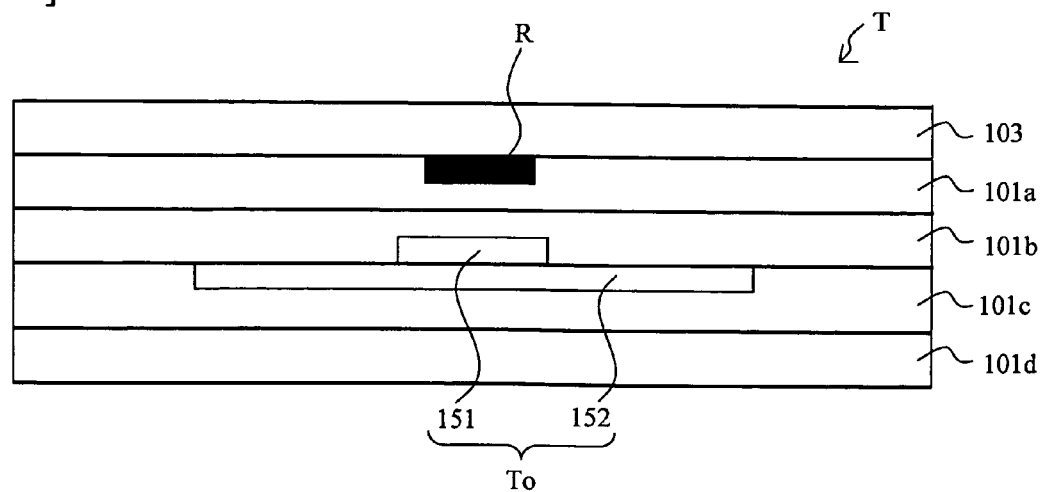

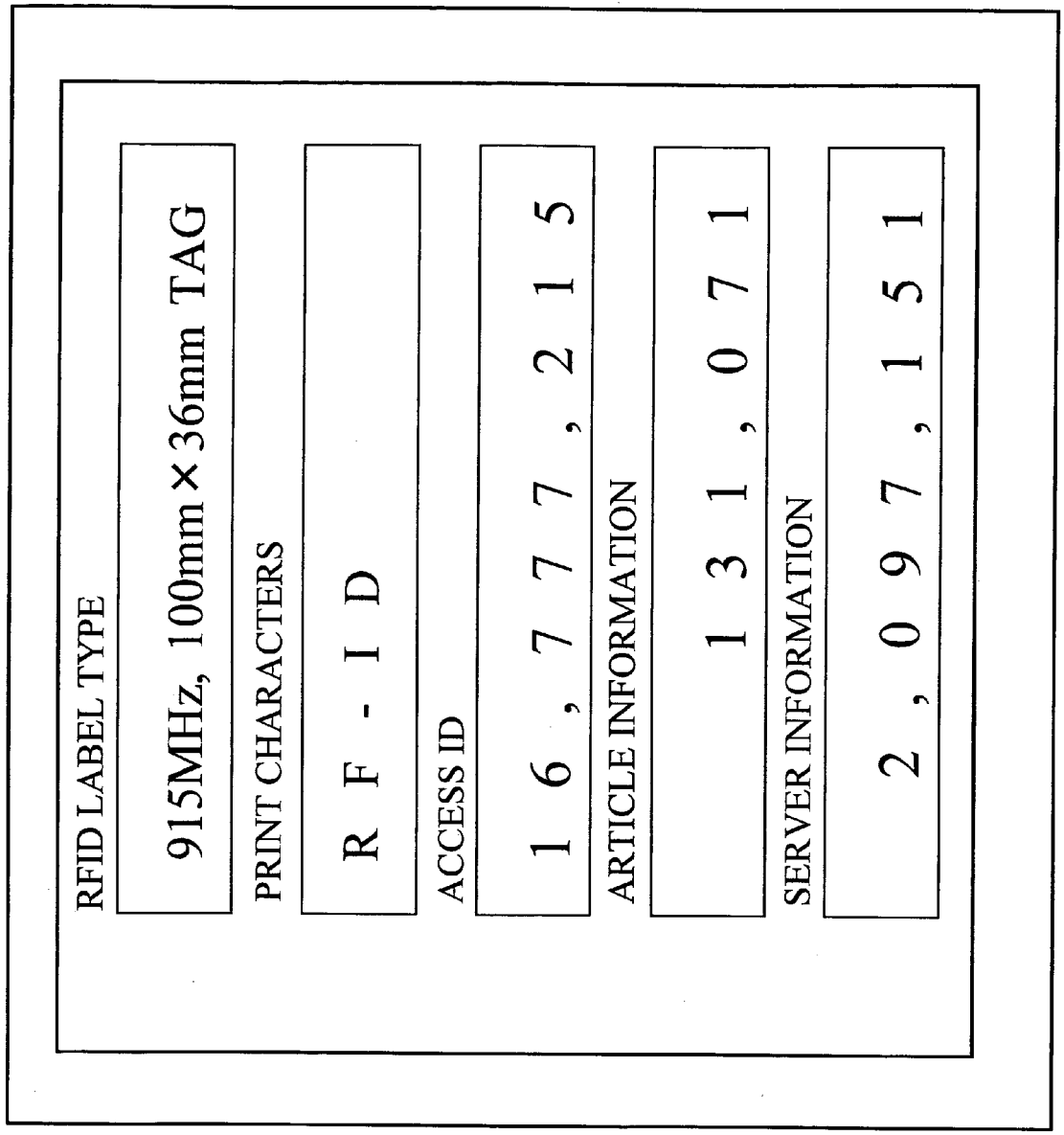
[FIG. 12]

[FIG. 13]
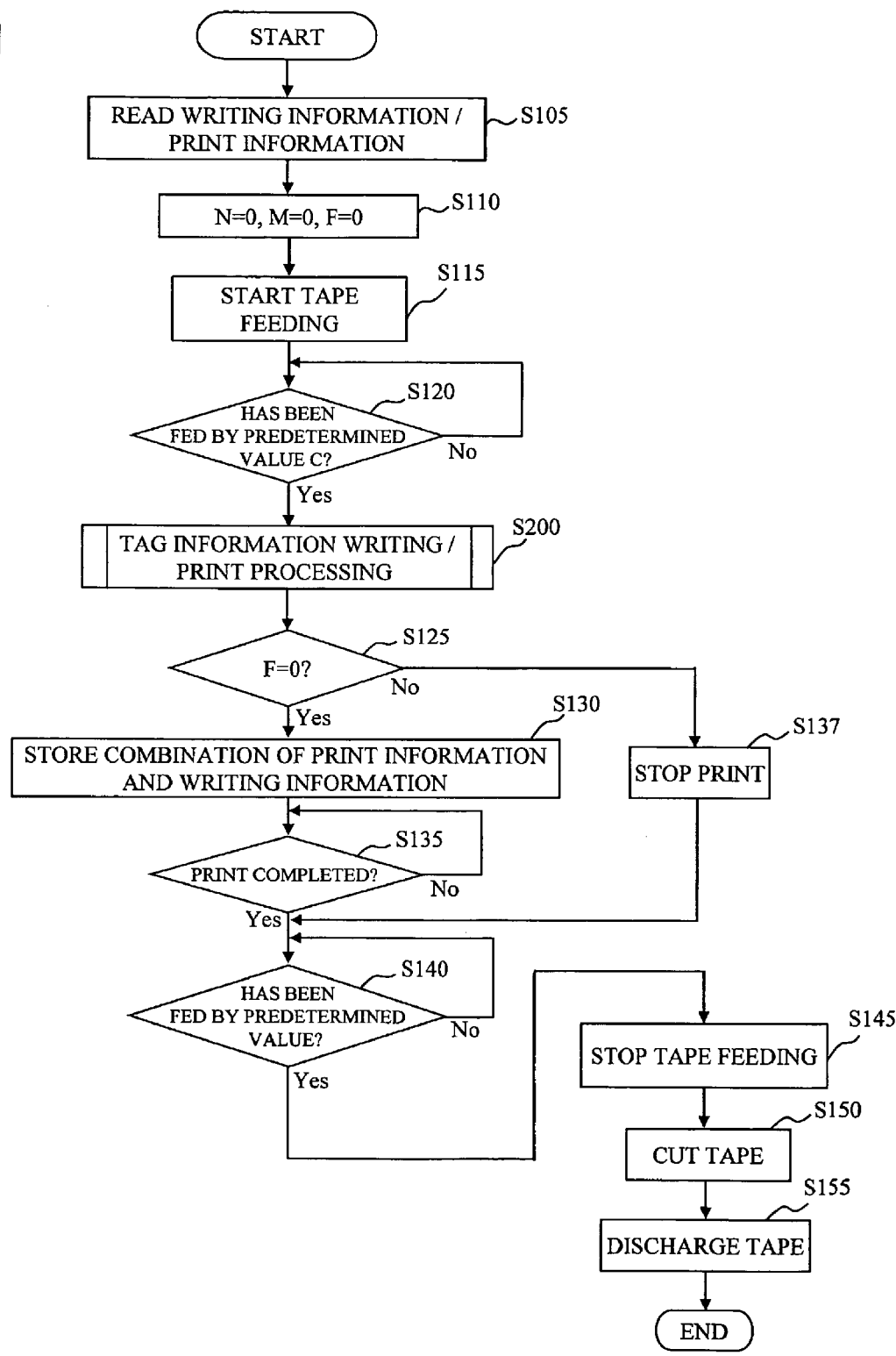

[FIG. 14]
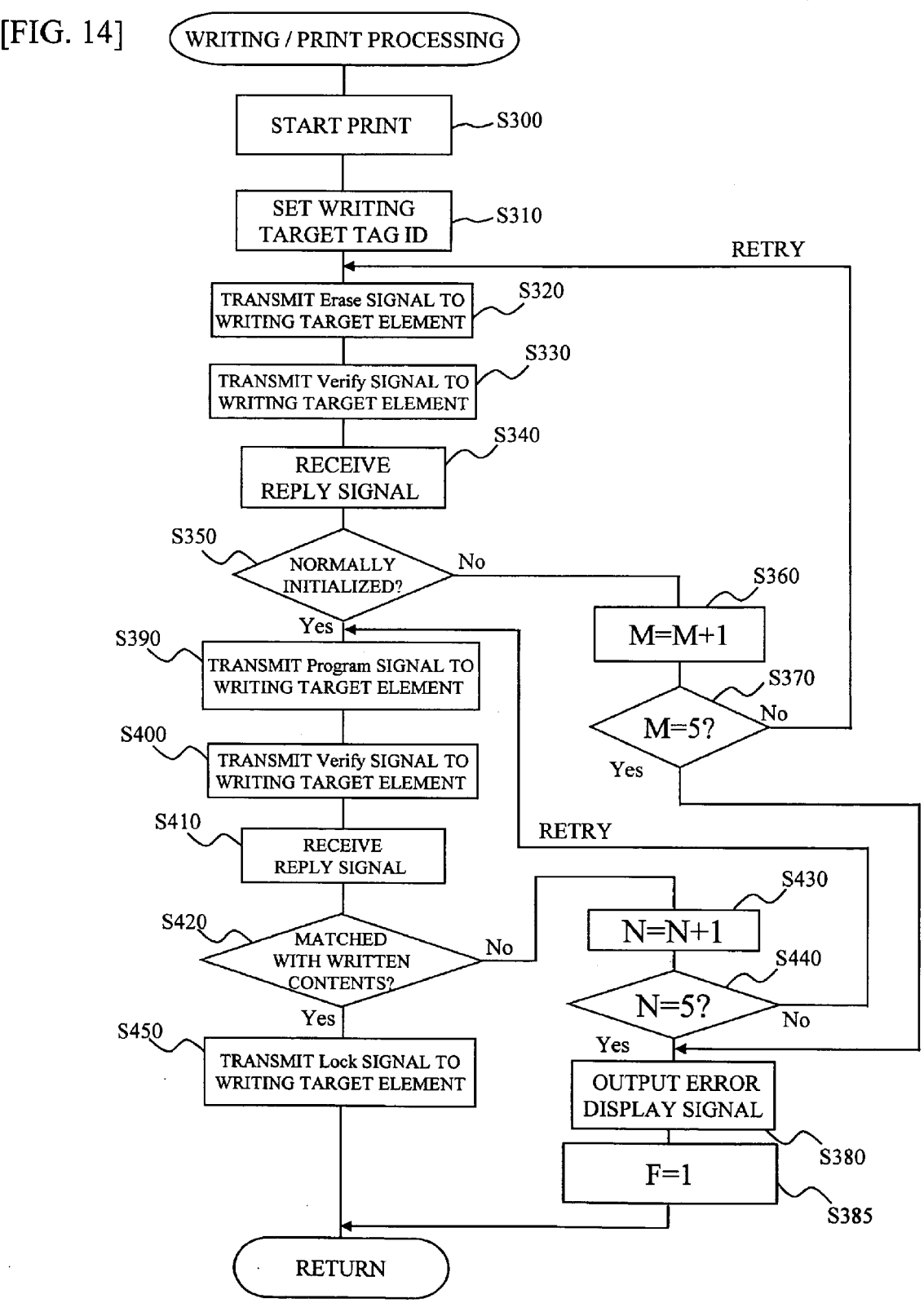

[FIG. 15A]
TAG ANTENNA, WIDTH = MEDIUM
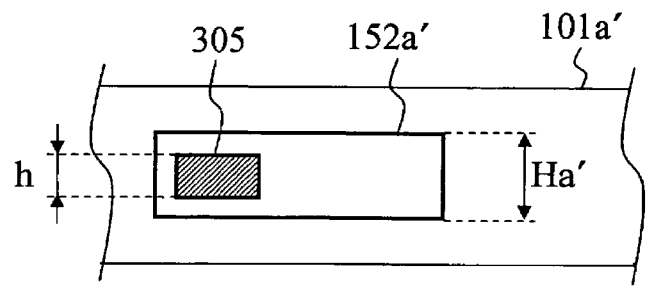
[FIG. 15B]
TAG ANTENNA, WIDTH = LARGE
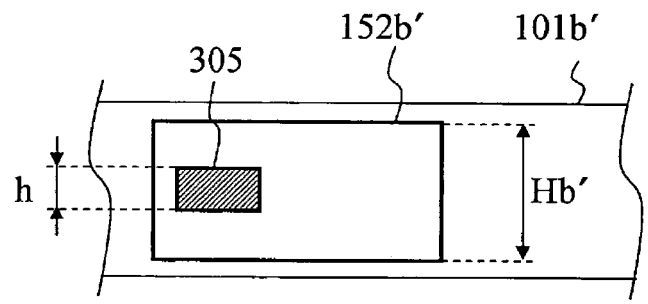
[FIG. 15C]
TAPE WIDTH = LARGE,
TAG ANTENNA WIDTH = LARGE
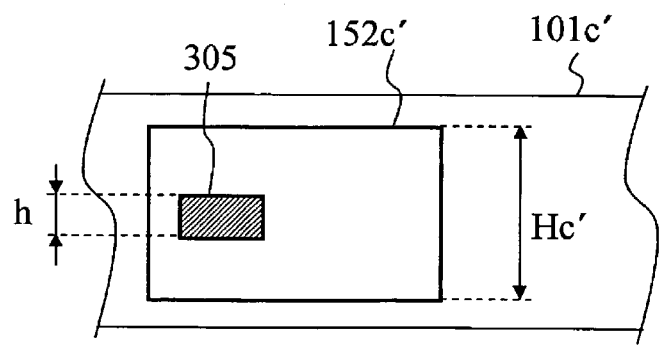

[FIG. 16]
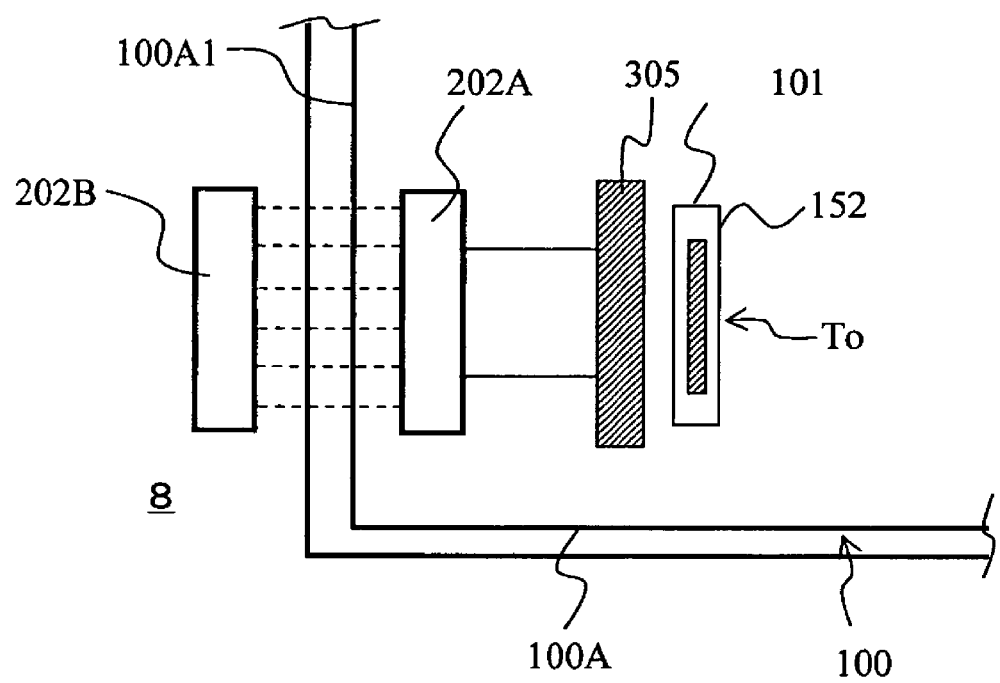

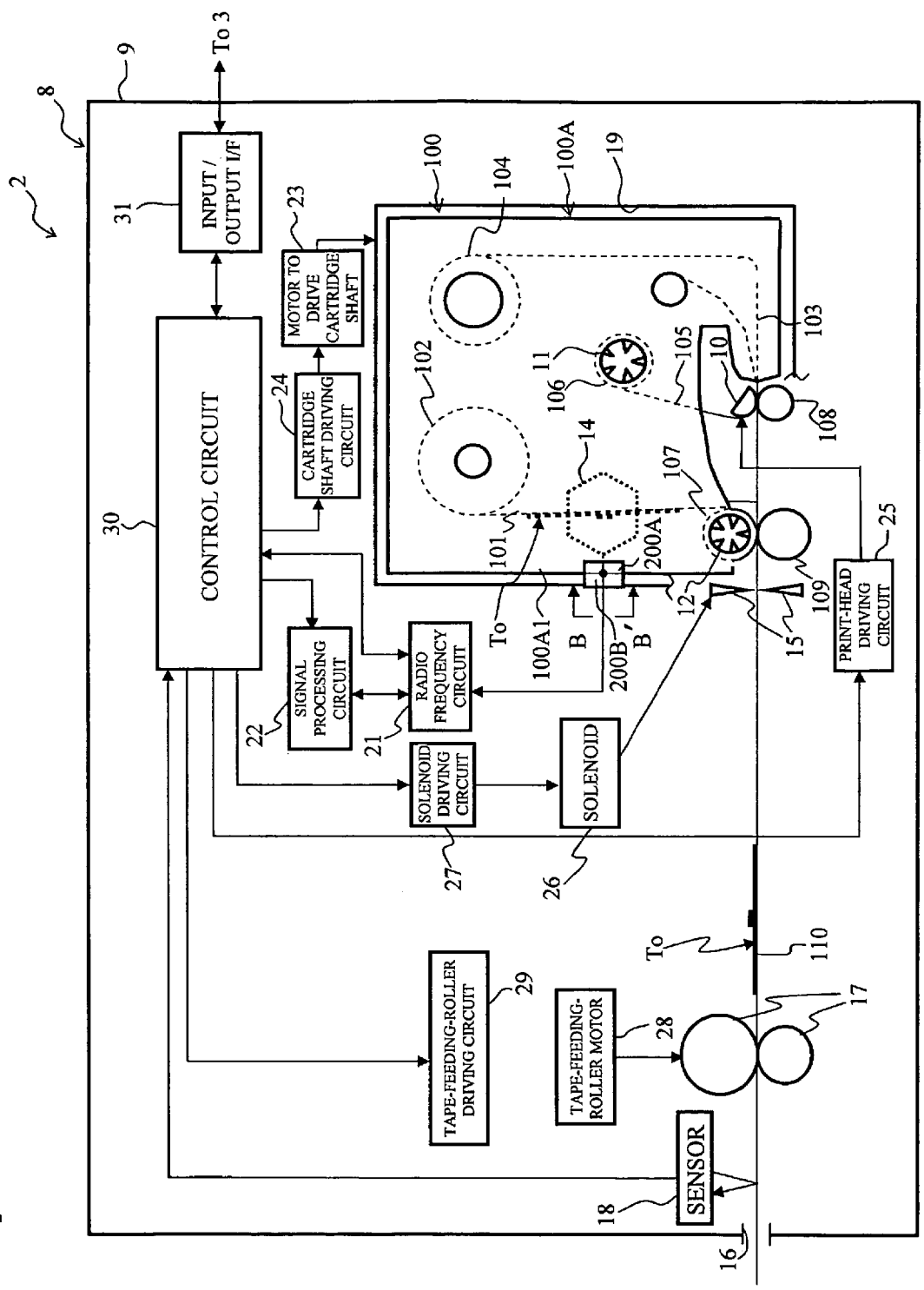
[FIG. 17]

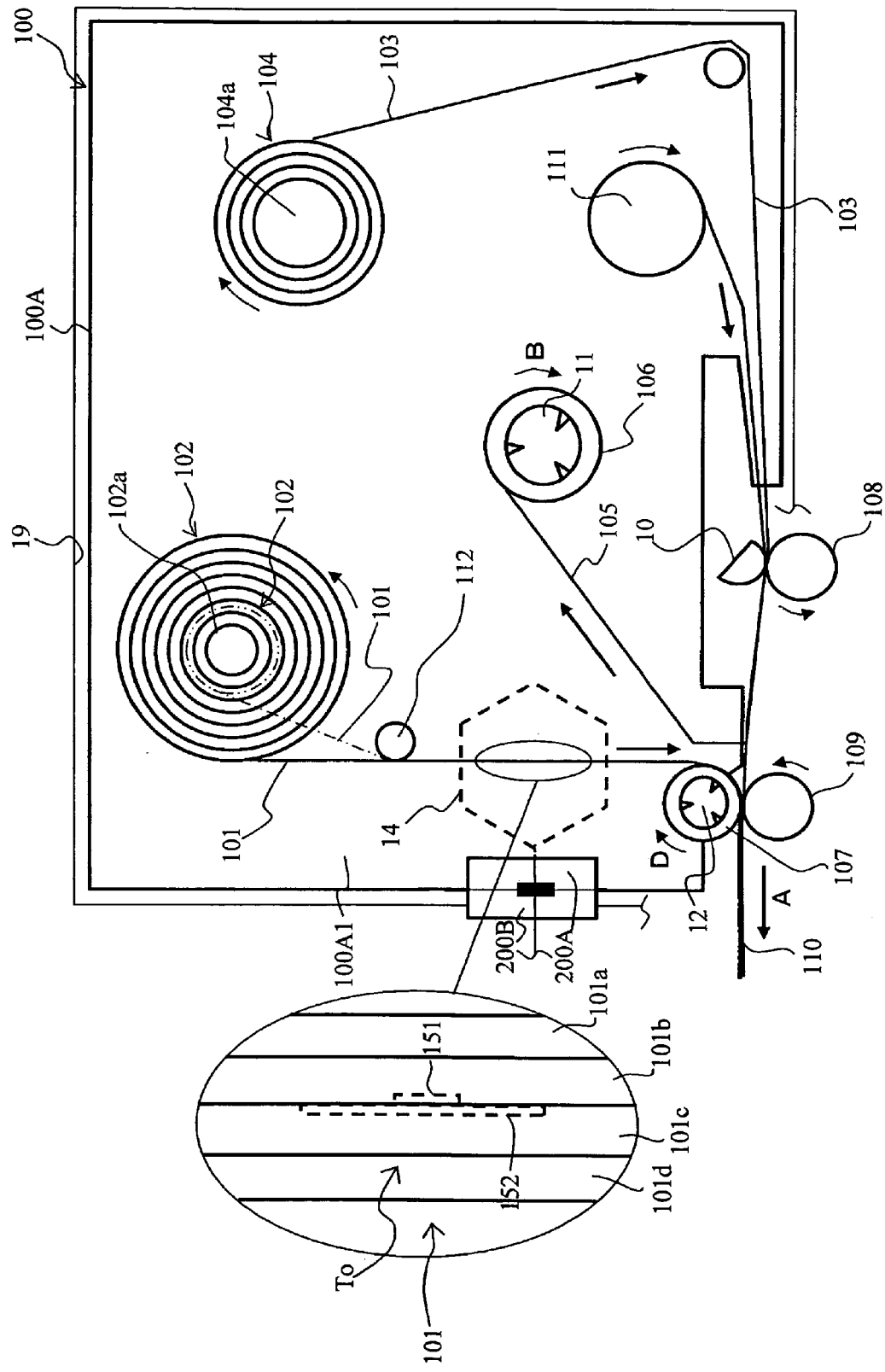
[FIG. 18]

[FIG. 19]
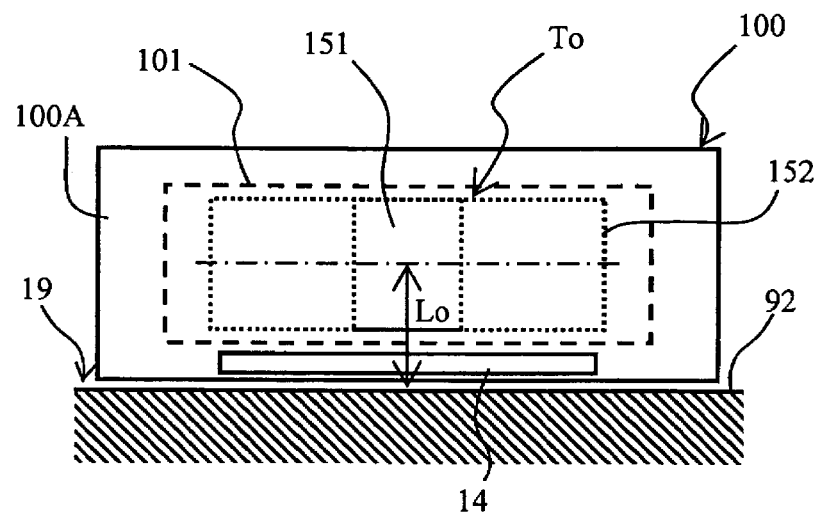

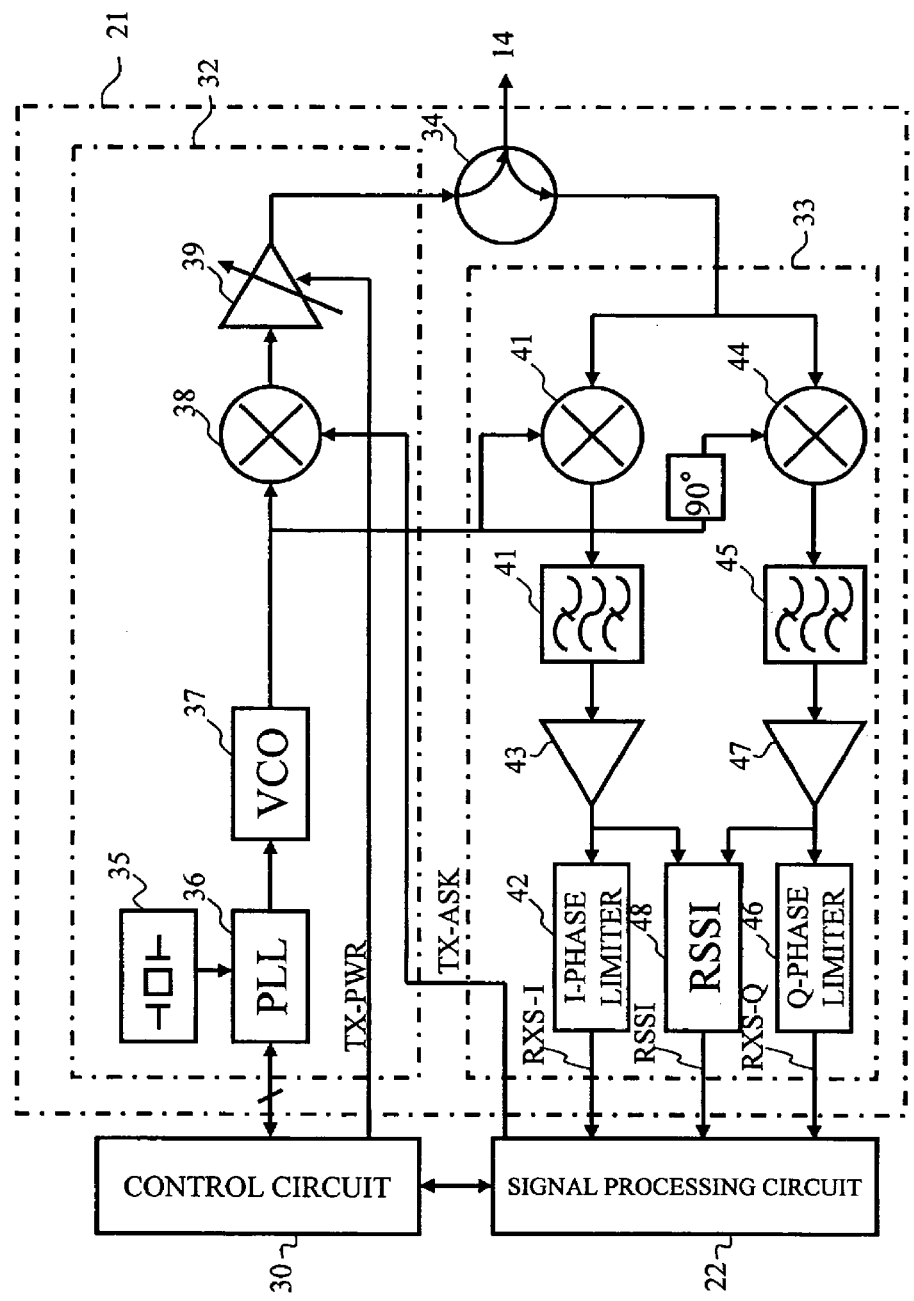
[FIG. 20]

[FIG. 21]
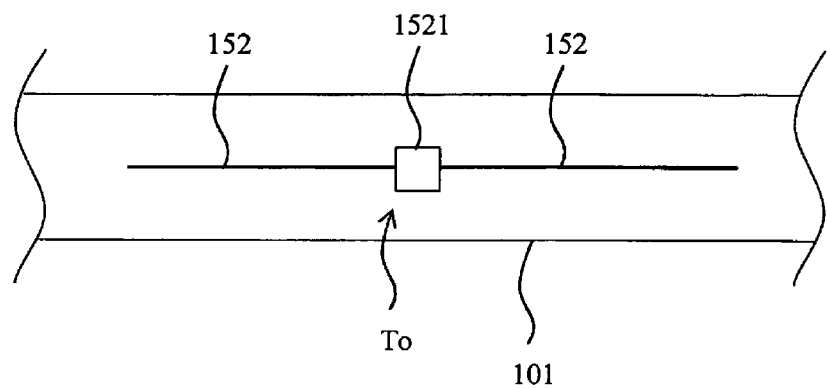
[FIG. 22]
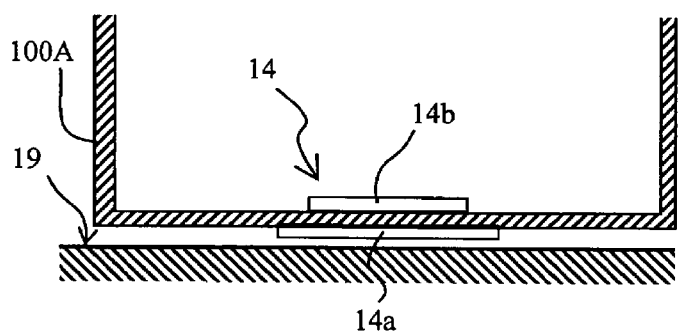

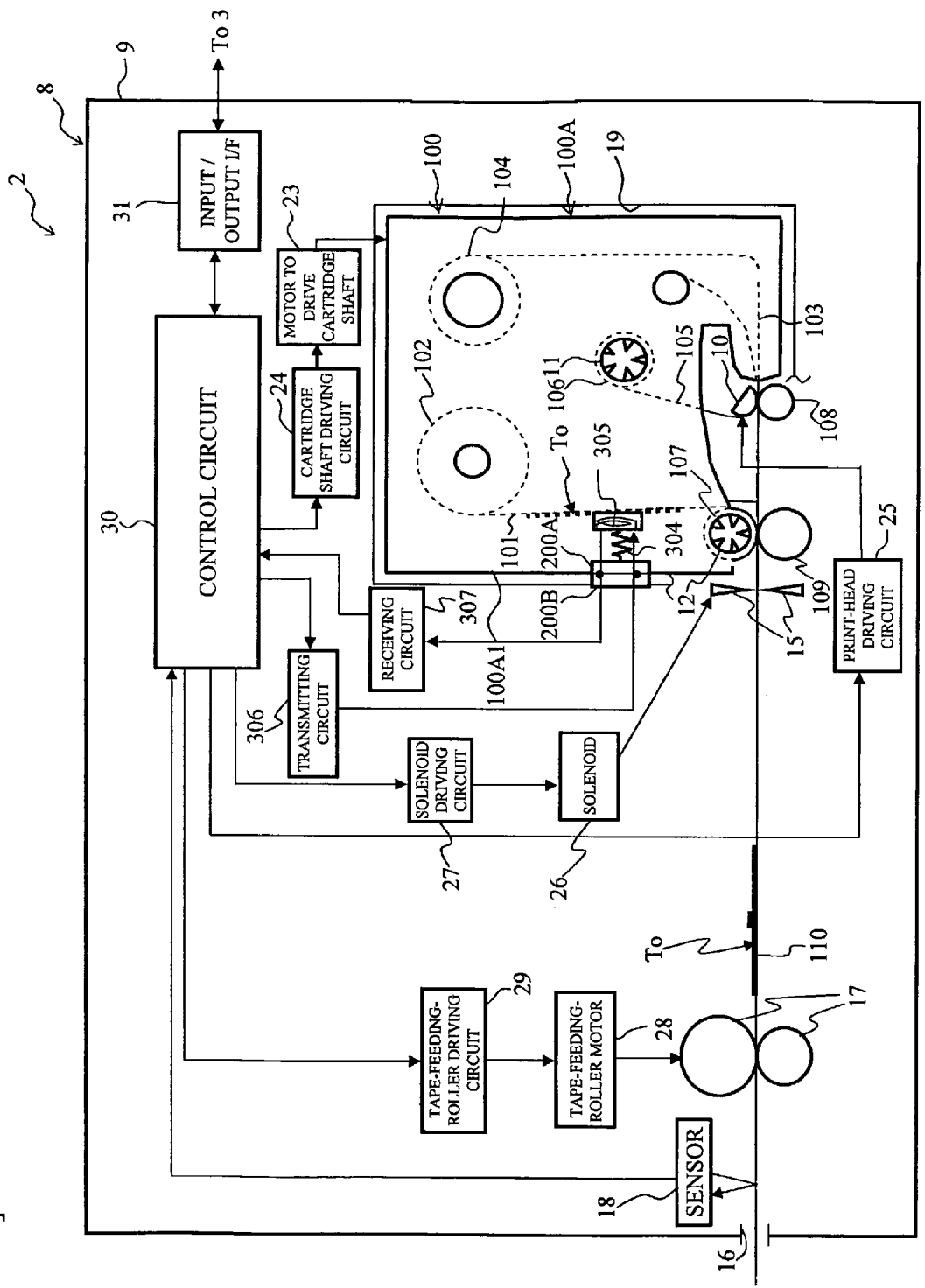
[FIG. 23]

CARTRIDGE FOR INCLUDING AT LEAST RFID TAG AND APPARATUS FOR COMMUNICATING WITH RFID TAG

CROSS-REFERENCE TO RELATED APPLICATION

This is a CIP application PCT/JP2007/60616, filed May 24, 2007, which was not published under PCT article 21(2) in English and claims the benefits of Japanese Patent application No. 2006-146387 filed May 26, 2006.

BACKGROUND OF THE INVENTION

1. Field of the Invention

The present invention relates to a cartridge for including at least a RFID tag provided with a RFID circuit element configured to perform radio communication of information with outside and an apparatus for communicating with a RFID tag configured to perform communication with the RFID circuit element.

2. Description of the Related Art

A RFID (Radio Frequency Identification) system configured to carry out reading/writing of information contactlessly between a small-sized RFID tag and a reader (reading device)/writer (writing device) has already been put into practice in various fields. For example, the RFID circuit element provided at a label-state or card-state RFID tag is provided with an IC circuit part storing desired RFID tag information and an antenna connected to the IC circuit part for information transmission/reception so that an access to the RFID tag information in the IC circuit part (information reading/writing) can be made from the side of the reader/writer.

As such apparatus for communicating with a RFID tag, the one as described in JP, A, 2005-141098 is known, for example. With this prior art, a band-state tag tape on which rectangular labels (RFID labels) are affixed with a predetermined interval (RFID label continuous body) is fed out of a roll of a tape with RFID tags (label supply portion) and when it is being fed on a feeding path, to an antenna of a RFID circuit element built in each label, desired RFID tag information created on the side of the apparatus is transmitted from the reader/writer (RFID data writing reading portion) and sequentially written in the IC circuit part (IC chip) connected to the antenna, while print information corresponding to the written RFID tag information is printed on a label surface by printing device (thermal head) so that a RFID label is completed.

In the above prior art, by integrating the reader/writer provided on the side of the apparatus for communicating with a RFID tag into a unit (cartridge) detachable with respect to an apparatus main body so that even if a roll of a tape with RFID tags of a different type is used after replacement, the reader/writer provided with a controller and an antenna corresponding to the tag tape of each roll of a tape with RFID tags (in other words, corresponding to the RFID circuit element) can be attached for use.

However, in the above prior art, though various readers/writers can be used through detachment and attachment according to each tag tape, whether the correspondence is correct or not depends on an operator, and it is not necessarily assured that a reader/writer with optimal communication characteristics to the RFID circuit element provided at the tag tape is attached by an operator. Further, even if various readers/writers are replaced and attached, since the positional relation between each reader/writer and the tag tape is constant, it has been difficult to realize an optimal communication distance for each RFID circuit element provided at the tag tape according to the element. As a result, it has been difficult to assuredly improve communication efficiency and communication accuracy in information transmission/reception to the RFID circuit element.

SUMMARY OF THE INVENTION

The present invention has an object to provide a cartridge for including at least a RFID tag and an apparatus for communicating with a RFID tag that can assuredly improve communication efficiency and communication accuracy in information transmission/reception to a RFID circuit element.

BRIEF DESCRIPTION OF THE DRAWING

FIG. 1 is a system block diagram illustrating a RFID tag manufacturing system to which an embodiment of an apparatus for producing RFID label of the present invention is applied.

FIG. 2 is a conceptual diagram illustrating a detailed structure of the apparatus for producing RFID label provided at the RFID tag manufacturing system in FIG. 1.

FIG. 3 is an explanatory diagram for illustrating a detailed structure of a cartridge for including at least a RFID tag provided at the apparatus for producing RFID label in FIG. 2.

FIG. 4 is a cross sectional diagram by A-A' in FIG. 3.

FIG. 5 is a diagram illustrating size and positional relation between a loop antenna of the RFID circuit element provided at a base tape fed out of a roll of a cartridge in FIG. 3 and a loop antenna provided on a side wall of a cartridge housing.

FIGS. 6A and 6B are diagrams for illustrating that a dimension of a tag antenna in FIG. 5 in the transport direction is larger than a value obtained by multiplying a feeding velocity of the base tape by time required for transmission/reception of information and by adding a dimension of the cartridge antenna in the transport direction to that.

FIG. 7 is a functional block diagram illustrating a functional configuration relating to an access function of the apparatus for producing RFID label in FIG. 2 to the RFID circuit element.

FIG. 8 is a circuit diagram schematically illustrating a circuit configuration of a connection portion among a transmitting circuit, a receiving circuit and a cartridge loop antenna constituting the access function in FIG. 7.

FIG. 9 is a functional block diagram illustrating a functional configuration of the RFID circuit element in FIG. 5.

FIGS. 10A and 10B are top view and bottom view respectively illustrating an example of an appearance of a RFID label formed by the apparatus for producing RFID label in FIG. 2.

FIG. 11 is a cross sectional diagram by X-X' section in FIG. 10.

FIG. 12 is a view illustrating an example of a screen displayed on a terminal or a general-purpose computer at an access to RFID tag information in an IC circuit part of the RFID circuit element by the apparatus for producing RFID label in FIG. 2.

FIG. 13 is a flowchart illustrating a control procedure executed by a control circuit of the apparatus for producing RFID label in FIG. 2.

FIG. 14 is a flowchart illustrating a detailed procedure of Step S200 in FIG. 12.

FIGS. 15A to 15C are conceptual diagrams illustrating examples of a relation between a width of a tag antenna and a width of the cartridge antenna in FIG. 5.

FIG. 16 is a sectional diagram for illustrating a variation in which power is supplied from the side of an apparatus main body to the cartridge antenna without using a connector.

FIG. 17 is a conceptual block diagram illustrating a detailed structure of the apparatus for producing RFID label in a variation using a microstrip antenna.

FIG. 18 is an explanatory diagram for illustrating a detailed structure of a cartridge for including at least a RFID tag provided at the apparatus for producing RFID label in FIG. 17.

FIG. 19 is a cross sectional diagram by B-B' section in FIG. 17.

FIG. 20 is a functional block diagram illustrating a detailed function of a radio frequency circuit provided at the apparatus for producing RFID label in FIG. 17.

FIG. 21 is a conceptual diagram illustrating a dipole type of the tag antenna disposed in the base tape.

FIG. 22 is a sectional diagram illustrating a variation of a microstrip antenna configuration.

FIG. 23 is a conceptual block diagram illustrating a detailed structure of the apparatus for producing RFID label in a variation in which the cartridge antenna is made movable toward the tape.

DETAILED DESCRIPTION OF THE PREFERRED EMBODIMENTS

An embodiment of the present invention will be described below referring to the attached drawings.

FIG. 1 is a system block diagram illustrating a RFID tag manufacturing system to which an apparatus for communicating with a RFID tag (apparatus for producing RFID label) of this In a RFID tag manufacturing system 1 shown in FIG. 1, an embodiment is applied. apparatus 2 for producing RFID label according to this embodiment is connected to a route server 4, a terminal 5, a general-purpose computer 6, and a plurality of information servers 7 through a wired or radio communication line 3.

FIG. 2 is a conceptual block diagram illustrating a detailed structure of the apparatus 2 for producing RFID label.

In FIG. 2, to an apparatus main body 8 of the apparatus 2 for producing RFID label, a cartridge holder portion 19 (cartridge holder) as a recess portion is provided, and to the holder portion 19, a cartridge 100 (cartridge for including at least a RFID tag) is detachably attached.

The apparatus main body 8 has a print head (printing device, thermal head) 10 that makes a desired print (printing) on a print-receiving tape 103 (print-receiving medium) fed out of a second roll 104, a ribbon take-up roller 106 provided with a driving shaft 11 that takes up an ink ribbon 105 having finished printing on the print-receiving tape 103, a tape feeding roller 107 provided with a driving shaft 12 (feeding device) that bonds, with the print-receiving tape 103, a base tape 101 (tag medium) fed out of a first roll 102 (roll of a tape with RFID tags) of the cartridge 100 and with which a signal has been transmitted/received by magnetic induction (including electromagnetic induction, magnetic coupling and other non-contact methods through a magnetic field) with a RFID circuit element To (the detail will be described later) by a loop antenna 305 (cartridge loop antenna) provided at the cartridge 100 so as to have a tag label tape 110 with print while feeding it out of the cartridge 100, a cutter 15 that cuts the tag label tape 110 with print at predetermined timing to a predetermined length and produces a label-like RFID label T (the detail will be described later), a feeding roller 17 that feeds the RFID label T to a carry-out exit 16, a tape end sensor 18 that is provided in the vicinity of the carry-out exit 16 and detects presence of the RFID label T, and a housing 9 that constitutes an outer profile and is provided with the cartridge holder portion 19 that accommodates them and detachably fits the cartridge 100 and the carry-out exit 16.

The loop antenna 305 is formed in a loop coil state and is provided inside a side wall 100A1 of a housing 100A of the cartridge 100 and is connected to a connector 200A (cartridge connector, cartridge power-supply device) installed facing the side wall 100A1. At the apparatus main body 8, a connector 200B (apparatus connector, apparatus power-supply device) is projected on a side wall opposing the connector 200A of the cartridge 100, and by attaching the cartridge 100 to the cartridge holder portion 19 of the apparatus main body 8, the connector 200A is connected to the connector 200B. The apparatus main body 8 is provided with a transmitting circuit 306 (command information creating device) and a receiving circuit 307 connected to the connector 200B so that power is supplied to the loop antenna 305 from the side of the apparatus main body 8 through the connectors 200B, 200A and an access is made to the RFID circuit element To (for reading or writing) by magnetic induction through the loop antenna 305.

The apparatus main body 8 also has a motor 23 to drive cartridge shaft that drives the above-mentioned ribbon take-up roller driving shaft 11 and the tape feeding roller driving shaft 12, a cartridge shaft driving circuit 24 that controls driving of the motor 23 to drive cartridge shaft, a print-head driving circuit 25 that controls electricity to the print head 10, a solenoid 26 that drives the cutter 15 so as to carry out a cutting operation, a solenoid driving circuit 27 that controls the solenoid 26, a tape-feeding-roller motor 28 that drives the feeding roller 17, and a control circuit 30 that controls operation of the entire apparatus 2 for producing RFID label through the transmitting circuit 306, the receiving circuit 307, the cartridge shaft driving circuit 24, the print-head driving circuit 25, the solenoid driving circuit 27, a tape-feeding-roller driving circuit 29 and the like.

The control circuit 30 is a so-called microcomputer. Though detailed description will be omitted, the control circuit 30 comprises a CPU, which is a central processing unit, ROM, RAM and the like and executes signal processing according to a program stored in the ROM in advance using the temporary storage function provided by the RAM. Furthermore, the control circuit 30 is connected to the communication line via the input/output interface 31, for example, so that information can be exchanged among the route server 4, the other terminals 5, the general-purpose computer 6, the information server 7 and the like connected to the communication line.

FIG. 3 is an explanatory diagram for illustrating the detailed structure of the cartridge 100, and FIG. 4 is a cross sectional diagram by A-A' section in FIG. 3.

In FIGS. 3 and 4, the loop antenna 305 provided inside the side wall 100A1 of the housing 100A of the cartridge 100 is arranged in the middle of a feeding path up to the tape feeding roller 107 of the base tape 101 fed out of the first roll 102 of the cartridge 100 close to the feeding path of the base tape 101 substantially in parallel with the feeding path so that a magnetic path of a magnetic flux generated at a coil of the loop antenna 305 cross a plane direction of the base tape 101 (substantially orthogonal in this example).

The cartridge 100 has the housing 10A, the first roll 102 around which the band-like base tape 101 arranged in the housing 100A is wound, the second roll 104 around which the transparent print-receiving tape 103 with substantially the same width as that of the base tape 101 is wound, a ribbonsupply-side roll 111 that feeds out the ink ribbon 105 (thermal transfer ribbon, however it is not needed when the print-receiving tape is a thermal tape), the ribbon take-up roller 106 that takes up the ribbon 105 after printing, the tape feeding roller 107, and a guide roller 112 (feeding-position regulating device) constituted in a non-adhesive manner using a fluorine resin and the like.

The tape feeding roller 107 presses and bonds the base tape 101 and the print-receiving tape 103 together so as to have the tag label tape with print and feeds the tape in a direction shown by an arrow A (also functioning as a feeding roller). The loop antenna 305 provided at the side wall 100A1 of the above-mentioned cartridge housing 100A is located on the upstream side in the transport direction of the base tape 101 than the tape feeding roller 107 so that an access to the RFID circuit element To (for reading or writing) provided at the base tape 101 is carried out by magnetic induction through the loop antenna 305 at the upstream position. Further, the print head 10 is arranged on the upstream side in the transport direction of the print-receiving tape 103 than the tape feeding roller 107. In this example, a distance from the tape feeding roller 107 to the tag access position by the loop antenna 305 is set so that it is larger than a distance from the tape feeding roller 107 to the print head 10.

The first roll 102 has the base tape 101 on which a plurality of RFID circuit elements To is sequentially formed with a predetermined equal interval in the longitudinal direction wound around a reel member 102a.

The base tape 101 has a four-layered structure (See the partially enlarged view in FIG. 3) in this example and is constructed in lamination in the order of an adhesive layer 101a made of an appropriate adhesive, a colored base film 101b made of polyethylene terephthalate (PET) and the like, an adhesive layer 101c made of an appropriate adhesive, and a separation sheet (separation material) 101d from the side wound inside (right side in FIG. 3) toward the opposite side (left side in FIG. 3).

On the back side of the base film 101b (left side in FIG. 3), a loop antenna 152 (tag loop antenna) constructed in the loop-coil shape for transmission/reception of information is provided integrally in this embodiment, the IC circuit part 151 connected to it and storing information is formed, and the RFID circuit element To is comprised by them. The tag antenna 152 can be also formed by printing on the base film 101b, for example.

On the front side of the base film 101b (right side in FIG. 3), the adhesive layer 101a for bonding the print-receiving tape 103 later is formed, while on the back side of the base film 101b (left side in FIG. 3), the separation sheet 101d is bonded to the base film 101b by the adhesive layer 101c provided so as to include the RFID circuit element To. When the RFID label T finally completed in the label state is to be affixed to a predetermined article and the like, the separation sheet 101d enables adhesion to the article and the like by the adhesive layer 101c through peeling-off of the separation sheet.

The second roll 104 has the print-receiving tape 103 wound around a reel member 104a. In the print-receiving tape 103 fed out of the second roll 104, the ribbon 105 arranged on its back face side (that is, the side to be bonded to the base tape 101) and driven by the ribbon-supply-side roll 111 and the ribbon take-up roller 106 is brought into contact with the back face of the print-receiving tape 103 by being pressed by the print head 10.

The ribbon take-up roller 106 and the tape feeding roller 107 are rotated and driven in conjunction by a driving force of the motor 23 to drive cartridge shaft (See the above-mentioned FIG. 2), which is a pulse motor, for example, provided outside the cartridge 100, transmitted to the ribbon take-up roller driving shaft 11 and the tape feeding roller driving shaft 12.

In the cartridge 100 with the above construction, the base tape 101 fed out of the first roll 102 is supplied to the tape feeding roller 107. On the other hand, as for the print-receiving tape 103 fed out of the second roll 104, the ink ribbon 105 arranged on its back face side (that is, the side bonded to the base tape 101) and driven by the ribbon-supply-side roll 111 and the ribbon take-up roller 106 is pressed by the print head 10 and brought into contact with the back face of the print-receiving tape 103.

When the cartridge 100 is attached to the cartridge holder portion 19 of the apparatus main body 8 and a roll holder (not shown) is moved from a release position to a contact position, the print-receiving tape 103 and the ink ribbon 105 are held between the print head 10 and a platen roller 108, and the base tape 101 and the print-receiving tape 103 are held between the tape feeding roller 107 and a sub-roller 109. Then, the ribbon take-up roller 106 and the tape feeding roller 107 are rotated and driven by the driving force of the motor 23 to drive cartridge shaft in directions shown by an arrow B and an arrow D, respectively, in synchronization with each other. At this time, the tape feeding roller driving shaft 12, the sub-roller 109, and the platen roller 108 are connected through a gear (not shown), and with the driving of the tape feeding roller driving shaft 12, the tape feeding roller 107, the sub-roller 109, and the platen roller 108 are rotated, and the base tape 101 is fed out of the first roll 102 and supplied to the tape feeding roller 107 as mentioned above. On the other hand, the print-receiving tape 103 is fed out of the second roll 104, and the plurality of heater elements of the print head 10 is electrified by the print-head driving circuit 25. As a result, a print R (See FIG. 10, which will be described later) corresponding to the RFID circuit element To on the base tape 101 to be an object to be bonded is printed on the back face of the print-receiving tape 103. Then, the base tape 101 and the print-receiving tape 103 on which the printing has been finished are bonded together by the tape feeding roller 107 and the sub-roller 109 to be integrated and formed as the tag label tape with print and fed out of the cartridge 100. The ink ribbon 105 finished with printing on the print-receiving tape 103 is taken up by the ribbon take-up roller 106 by driving of the ribbon take-up roller driving shaft 11.

FIG. 5 is a diagram illustrating an example of the size and a positional relation between the loop antenna 152 of the RFID circuit element To provided at the base tape 101 fed out of the first roll 102 and the loop antenna 305 provided at the cartridge housing 100A.

As mentioned above, the RFID circuit element To is constituted by the loop antenna 152 constructed in the loop coil shape for information transmission/reception and an IC circuit part 151 connected thereto and storing information. At each cartridge 100, the loop antenna 152 of the RFID circuit element To (hereinafter described as "tag antenna 152" as appropriate) and the loop antenna 305 on the side of the cartridge 100 (hereinafter described as "cartridge antenna 305" as appropriate) are, as shown in FIG. 5, constituted so that a dimension H of the tag antenna 152 in the width direction of the base tape 101 feeding path and a dimension h of the cartridge antenna 305 in the width direction of the tape feeding path are substantially equal to each other.

On the other hand, a dimension L2 of the tag antenna 152 in the transport direction of the base tape 101 feeding path is, as shown in FIG. 6, set so that it is larger than a value obtained by multiplying a feeding velocity v of the base tape 101 by a time T required for information transmission/reception with the RFID circuit element To through the cartridge antenna 305 by the control circuit 30 and the transmitting/receiving circuits 306, 307 of the apparatus main body 8 and adding a dimension L1 of the cartridge antenna 305 in the transport direction of the feeding path (that is, vT+L1).

As a result, since the cartridge antenna 305 can be assuredly opposed to the tag antenna 152 being fed during the time required for communication, information transmission/reception can be assuredly performed.

The tag antenna 152 and the cartridge antenna 305 in the above size relation are arranged as shown in FIG. 5, so that center axes thereof in the width direction of the feeding path (center axes X in this case) substantially match each other. As mentioned above, in each cartridge 100, the center axes of the both antennas 152, 305 substantially match each other (that is, the centers of the tag coil and the apparatus coil in the width direction substantially match each other). To the cartridge holder portion 19, plural types of the cartridge 100 accommodating the base tape with different width (or the base tape provided with the RFID circuit element To with the different width of the tag antenna) can be attached, but the above positional relation between the both antennas 152, 305 is maintained in each cartridge 100, and the center axes of the both antennas 152, 305 substantially match each other no matter what type of the cartridge 100 is attached.

FIG. 7 is a functional block diagram illustrating a functional configuration relating to an access (writing or reading) function to the RFID circuit element of the apparatus for producing RFID label.

In FIG. 7, the apparatus 2 for producing RFID label has the transmitting circuit 306 that generates a carrier wave for making an access (for reading/writing) to the RFID circuit element To through the loop antenna 305 and modulates the carrier wave based on a control signal input from the control circuit 30, the receiving circuit 307 that demodulates a response signal received from the RFID circuit element To through the loop antenna 305 and outputs it to the control circuit 30, and the control circuit 30 that carries out modulation control of the carrier wave in the transmitting circuit 306 and processing of a signal demodulated by the receiving circuit 307. The transmitting circuit 306 and the receiving circuit 307 are connected to the loop antenna 305 through the connector 200B on the side of the apparatus main body and the connector 200A on the side of the cartridge 100 as mentioned above.

FIG. 8 is a circuit diagram schematically illustrating a circuit configuration of a connection portion among the transmitting circuit 306, the receiving circuit 307, and the loop antenna 305.

In FIG. 8, the transmitting circuit 306 and the receiving circuit 307 are connected to the loop antenna 305 through the connectors 200B, 200A, and the capacitor 310 is inserted between the receiving circuit 307 and the connector 200A.

FIG. 9 is a functional block diagram illustrating a functional configuration of the RFID circuit element To. In FIG. 9, the RFID circuit element To has the tag loop antenna 152 that transmits/receives a signal contactlessly by magnetic induction with the antenna 305 on the side of the cartridge 100 and the IC circuit part 151 connected to the loop antenna 152.

The IC circuit part 151 includes a rectification part 153 that rectifies the carrier wave received by the loop antenna 152, a power source part 154 that accumulates energy of the carrier wave rectified by the rectification part 153 so as to make it a driving power supply, a clock extraction part 156 that extracts a clock signal from the carrier wave received by the loop antenna 152 so as to supply it to a control part 155, a memory part 157 which can store a desired information signal, a modem part 158 connected to the loop antenna 152, and the control unit 155 that controls operation of the RFID circuit element To through the rectification part 153, the clock extraction part 156, the modem part 158 and the like.

The modem part 158 demodulates a communication signal from the loop antenna 305 of the cartridge 100 received by the loop antenna 152 and modulates and reflects the carrier wave received at the loop antenna 152 based on the response signal from the control part 155.

The control part 155 interprets a received signal demodulated by the modem part 158, creates a reply signal based on the information signal stored in the memory part 157, and executes basic control such as control of reply by the modem part 158.

FIGS. 10A and 10B are views illustrating an example of an appearance of the RFID label T formed by completing information writing (or reading) of the RFID circuit element To by the apparatus 2 for producing RFID label with the above configuration and cutting of the tag label tape 110 with print, in which FIG. 10A is a top view, and FIG. 10B is a bottom view. FIG. 11 is a cross sectional view by X-X' section in FIG. 10A.

In FIGS. 10A, 10B, and 11, the RFID label T is in the five-layered structure in which the print-receiving tape 103 is added to the four-layered structure shown in FIG. 3 made of five layers of the print-receiving tape 103, the adhesive layer 101a, the base film 101b, the adhesive layer 101c, and the separation sheet 101d from the print-receiving tape 103 side (upper side in FIG. 11) to the opposite side (lower side in FIG. 11). In addition, the RFID circuit element To including the loop antenna 152 provided on the back side of the base film 101b as mentioned above is provided in the adhesive layer 101c, and the print R (characters of "RF-ID" representing the type of the RFID label T in this embodiment) is printed on the back face of the print-receiving tape 103.

FIG. 12 is a view illustrating an example of a screen displayed in the terminal 5 or the general-purpose computer 6 at an access to the RFID tag information (reading or writing) of the IC circuit part 151 of the RFID circuit element To by the above-mentioned apparatus 2 for producing RFID label.

In FIG. 11, in this example, a type of the RFID label (access frequency and tape dimension), the print characters R printed in correspondence with the RFID circuit element To, an access (reading or writing) ID, which is an ID specific to the RFID circuit element To, an address of article information stored in the information server 7, storage location address of the corresponding information in the route server 4 and the like can be displayed at the terminal 5 or the general-purpose computer 6. Then, the apparatus 2 for producing RFID label is operated by the operation of the terminal 5 or the general-purpose computer 6, the print characters R are printed on the base film 101c, and the information such as the writing ID, article information and the like are written in the IC circuit part 151 (or the RFID tag information such as the article information stored in advance in the IC circuit part 151 is read out).

At the above reading or writing, correspondence between the ID of the produced RFID label T and the information read out of its IC circuit part 151 (or information written in the IC circuit part 151) is stored in the above-mentioned route server 4 so that it can be referred to as necessary.

FIG. 13 is a flowchart illustrating a control procedure executed by the control circuit 30 when the above-mentioned RFID label T is produced, that is, the base tape 101 is fed and the RFID tag information is written while the print-receiving tape 103 is fed and the desired print is made by the print head 10 and the print-receiving tape 103 and the base tape 101 are bonded together to have the tag label tape 110 with print and then, the tag label tape 110 with print is cut for each RFID circuit element To have the RFID label T.

In FIG. 13, first, at Step S105, when a writing operation of the apparatus 2 for producing RFID label is carried out, this flow is started. Then, the RFID tag information (RFID tag control information) to be written in the RFID circuit element To input and operated through the terminal 5 or the general-purpose computer 6 and print information to be printed on the RFID label T by the print head 10 in correspondence with the RFID tag information are read through the communication line 3 and the input/output interface 31.

Subsequently, at Step S110, variables M, N that count the number of times of retries (retry times) when there is no response from the RFID circuit element To and a flag F indicating if the communication is favorable or not are initialized to zero.

Then, at Step S115, a control signal is output to the cartridge shaft driving circuit 24 so as to rotate and drive the ribbon take-up roller 106 and the tape feeding roller 107 by the driving force of the motor 23 to drive cartridge shaft. As a result, the base tape 101 is fed out of the first roll 102 and supplied to the tape feeding roller 107, while the print-receiving tape 103 is fed out of the second roll 104. Moreover, a control signal is output to the tape-feeding-roller motor 28 through the tape-feeding-roller driving circuit 29 so as to rotate and drive the feeding roller 17. As a result, as mentioned above, the base tape 101 and the print-receiving tape 103 are bonded together and integrated by the tape feeding roller 107 (and the sub-roller 109) and fed in a direction outside the cartridge 100 as the tag label tape 110 with print.

Subsequently, the routine goes to Step S120, in which it is determined if the base tape 101 and the print-receiving tape 103 have been fed by a predetermined value C (a feeding distance for which the RFID tag information writing and printing to the preceding RFID circuit element To and the print region of the print-receiving tape 103 corresponding thereto have been finished and the subsequent RFID circuit element To reaches a position substantially opposed to the loop antenna 305, for example) or not. It is sufficient for this feeding distance determination at this time to detect an appropriate identification mark provided on the base tape 101 by a known tape sensor provided separately, for example. If the determination is satisfied, the routine goes to Step S200.

At Step S200, after tag information writing/print processing is carried out and the memory is initialized (erased) for writing, a transmission signal including the RFID tag information is transmitted to the RFID circuit element To on the base tape 101 for writing and the print R is printed on a corresponding region of the print-receiving tape 103 by the print head 10 (for detail, see FIG. 13, which will be described later). When Step S200 is finished, the routine goes to Step S125.

At Step S125, it is determined if the flag F=0 or not. If the writing processing has been normally completed, it is still F=0 (See Step S385 in the flow shown in FIG. 14, which will be described later), and the determination is satisfied and the routine goes on to Step S130.

At Step S130, combination of the information written in the RFID circuit element To at Step S200 and the print information having been already printed by the print head 10 in correspondence with that is output through the input/output interface 31 and the communication line 3 or through the terminal 5 or the general-purpose computer 6 and stored in the information server 7 or the route server 4. The stored data is stored and held in a database, for example, so that it can be referred to from the terminal 5 or the general-purpose computer 6 when necessary.

Subsequently, at Step S135, it is checked if all the prints to the region corresponding to the RFID circuit element To be processed at this time in the print-receiving tape 103 have been completed or not and then, the routine goes to Step S140.

In the above-mentioned Step S125, if the writing processing has not been normally completed for some reason, it becomes F=1 (See Step S385 in the flow shown in FIG. 14, which will be described later), and the determination at S125 is not satisfied and the routine goes onto Step S137, in which a control signal is output to the print-head driving circuit 25 so as to stop electricity to the print head 10 and stop printing. It is apparently displayed that the RFID circuit element To is not a non-defective product by interruption of printing in this way. Instead of the printing interruption, print in special form such as warning/caution and the like of the fact may be applied.

When step S137 is finished, the routine goes to Step S140.

At Step S140, it is determined if the tag label tape 110 with print has been further fed by a predetermined amount (a feeding distance for which the targeted RFID circuit element To and all the print regions of the print-receiving tape 103 corresponding thereto exceed the cutter 15 by a predetermined length (margin), for example) or not. It is sufficient for the feeding distance determination at this time to detect a marking by a tape sensor similarly to the above-mentioned Step S120, for example. If the determination is satisfied, the routine goes to Step S145.

At Step S145, a control signal is output to the cartridge shaft driving circuit 24 and the tape-feeding-roller driving circuit 29 so as to stop driving of the motor 23 to drive cartridge shaft and the tape-feeding-roller motor 28 and stop rotation of the ribbon take-up roller 106, the tape feeding roller 107, and the feeding roller 17. As a result, the feeding-out of the base tape 101 from the first roll 102, the feeding-out of the print-receiving tape 103 from the second roll 104 and the feeding of the tag label tape 110 with print by the feeding roller 17 is stopped.

Subsequently, at Step S150, a control signal is output to the solenoid driving circuit 27 so as to drive the solenoid 26 and to cut the tag label tape 110 with print by the cutter 15. As mentioned above, the entire tag label tape 110 with print in which the RFID circuit element To be processed and the print region of the print-receiving tape 103 corresponding thereto are bonded together has sufficiently gone beyond the cutter 15 at this time, and by the cutting by this cutter 15, and the label-state RFID label T in which the RFID tag information is written into the RFID circuit element To and the desired print corresponding thereto is made is produced.

Subsequently, the routine goes to Step S155, where a control signal is output to the feeding roller driving circuit 29 so as to resume the driving of the tape-feeding-roller motor 28 and rotate the feeding roller 17. As a result, the feeding by the feeding roller 17 is resumed and the RFID label T produced in the label state at Step S150 is fed toward the carry-out exit 16 and discharged to outside the apparatus 2 from the carry-out exit 16.

FIG. 14 is a flowchart illustrating a detailed procedure of the above-mentioned Step S200.

In FIG. 14, first, at step S300, a control signal is output to the print-head driving circuit 25 so as to energize the print head 10 and print the print R such as characters, symbols, barcodes and the like read out at Step S105 in the above-mentioned FIG. 13 in a region corresponding to the RFID circuit element To be processed in the print-receiving tape 103 (a region to be bonded to the back face of the RFID circuit element To by the tape feeding roller 107).

Then, at Step S310, an identification number ID to be assigned to the RFID circuit element To be written in is set by a known appropriate method.

Subsequently, at Step S320, a control signal is output to the transmitting circuit 306, and a carrier wave given predetermined modulation as an "Erase" signal that initializes information stored in the memory part 157 of the RFID circuit element To is transmitted to the RFID circuit element To be written in through the loop antenna 305. As a result, the memory part 157 of the RFID circuit element To is initialized.

Subsequently, at Step S330, a control signal is output to the transmitting circuit 306, and a carrier wave given predetermined modulation as the "Verify" signal that verifies contents of the memory part 157 is transmitted to the RFID circuit element To as information writing target through the loop antenna 305, and a reply is prompted.

Subsequently, at Step S340, a reply signal transmitted from the RFID circuit element To be written in corresponding to the "Verify" signal is received through the loop antenna 305 and taken in through the receiving circuit 307.

Subsequently, at Step S350, on the basis of the received reply signal, information in the memory part 157 of the RFID circuit element To is verified so as to determine if the memory part 157 has been normally initialized.

If the determination is not satisfied, the routine goes to Step 360, in which one is added to M, and it is determined if M=5 or not at Step S370. In the case of M≦4, the determination is not satisfied but the routine returns to Step S320 and the same procedure is repeated. In the case of M=5, the routine goes to Step S380, in which an error display signal is output to the terminal 5 or the general-purpose computer 6 through the input/output interface 31 and the communication line 3 so that corresponding writing failure (error) display is made and this flow is finished. In this way, even if initialization is not successful, retry is made up to 5 times. If the entire base tape 101 wound around the first roll 102 has been consumed and lost, since a reply signal at Step S340 is not received due to absence of the RFID circuit element To, the determination at Step S350 is not satisfied and the above display is made at Step S380.

If the determination at Step S350 is satisfied, the routine goes to step S390, where a control signal is output to the transmitting circuit 306, and the carrier wave given predetermined modulation is transmitted to the RFID circuit element To as information writing target through the loop antenna 305 as a "Program" signal that has desired data written in the memory part 157 and the information is written.

Subsequently, at Step S400, a control signal is output to the transmitting circuit 306, the carrier wave given predetermined modulation as the "Verify" signal is transmitted to the RFID circuit element To as writing target of information through the loop antenna 305, and a reply is prompted. Subsequently, at Step S410, the reply signal transmitted from the RFID circuit element To as writing target of information in correspondence with the "Verify" signal is received through the loop antenna 305 and taken in through the receiving circuit 307.

Subsequently, at Step S420, on the basis of the received reply signal, the information stored in the memory part 157 of the RFID circuit element To is verified and it is determined if the above-mentioned transmitted desired information has been normally stored in the memory part 157 or not.

If the determination is not satisfied, the routine goes to Step S430, where one is added to N, and it is further determined at Step S440 if it is N=5 or not. In the case of N≦4, the determination is not satisfied and the routine returns to Step S390, where the same procedure is repeated. In the case of N=5, the routine goes to the above-mentioned Step S380, where a corresponding writing failure (error) display is similarly made at the terminal 5 or the general-purpose computer 6, the above-mentioned flag F=1 is set at step S385, and this flow is finished. In this way, even if information writing is not successful, retry is made up to 5 times.

If the determination at Step S420 is satisfied, the routine goes to step S450, where a control signal is output to the transmitting circuit 306, and the carrier wave given predetermined modulation as a "Lock" command is transmitted to the RFID circuit element To as writing target of information through the loop antenna 305 so as to prohibit new information writing in the RFID circuit element To. As a result, writing of the RFID tag information in the RFID circuit element To as writing target is finished, the RFID circuit element To is discharged as mentioned above, and this flow is finished.

By the above routine, in the cartridge 100, the corresponding RFID tag information can be written in the RFID circuit element To be written in on the base tape 101 and the print R corresponding to the RFID tag information can be printed on the corresponding region on the print-receiving tape 103.

In the above, the case where the RFID tag information is transmitted to the RFID circuit element To and writing is made in the IC circuit part 151 so as to produce the RFID label T has been described, but not limited to that, there is a case where the RFID tag information is read out from the RFID circuit element To for read-only in which desired RFID tag information is stored and held unrewritably in advance, while the print corresponding to that is applied to produce the RFID label T.

In this case, it is only necessary to read out only the print information at Step S105 in FIG. 13 and to carry out reading/print processing of the RFID tag information at Step S200. Subsequently, the combination of the print information and the read-out RFID tag information is stored at Step S130.

In the above-mentioned FIG. 5, in the cartridge 100, a dimension H of the tag antenna 152 in the width direction of the base tape 101 feeding path and a dimension h of the cartridge antenna 305 in the width direction of the tape feeding path are configured to be substantially equal to each other, but not limited to that. For example, as exemplified in FIGS. 15A to 15C, respectively, width-direction dimensions Ha', Hb', Hc' of tag antennas 152a', 152b', 152c' of base tapes 101a', 101b', 101c' may be configured larger than the width-direction dimension h of the cartridge antenna 305 (in this example, positions of the center axes in the width direction are all matched with each other). Since an overlapping area (shaded part in the figure) is constant even if there are plural types of width as in the tag antennas 152a', 152b', 152c', it becomes possible for the magnetic flux having passed through the antenna 305 to pass through the tag antennas 152a', 152b', 152c' with the same condition, by which the communication condition can be made constant. Therefore, assuredness of information transmission/reception can be improved.

In the apparatus 2 for producing RFID label of this embodiment configured as above, the cartridge 100 is attached to the cartridge holder portion 19 of the apparatus main body 8, the print-receiving tape 103 fed out of the second roll 104 of the cartridge 100 and applied with the desired print by the print head 10 and the base tape 101 fed out of the first roll 102 and in which information transmission/reception has been performed with the RFID circuit element To via radio communication in a magnetic induction method by the loop antenna 305 are bonded together by the tape feeding roller 107 of the apparatus main body 8 so as to be the tag label tape 110 with print, and the RFID label T is produced using the tag label tape 110.

At this time, in this embodiment, as mentioned above, by providing the loop antenna 305 inside the side wall 100A1 of the housing 100A in the cartridge 100 and by attaching the cartridge 100 to the cartridge holder portion 19 of the apparatus main body 8, the connector 200A on the side of the cartridge 100 is connected to the connector 200B on the side of the apparatus main body 8, power is supplied from the side of the apparatus main body 8 to the loop antenna 305 through the connectors 200B and 200A, and information is transmitted/received with the RFID circuit element To provided at the base tape 101 by the loop antenna 305 in the middle of the feeding path of the base tape 101.

As mentioned above, by providing the loop antenna 305 configured to perform information transmission/reception with the RFID circuit element To on the side of the cartridge 100, unlike the case where a single antenna is provided on the side of the apparatus main body 8 and used commonly in communication to all the cartridges or a case where the antennas on the side of the apparatus are integrated into a unit so as to be detachably attached upon discretion of an operator, the antenna (loop antenna 305) optimal for the layout, attributes such as tape width, width and the like of the tag antenna 152 and communication characteristics of the RFID circuit element To (including making the communication distance constant and appropriate) can be used assuredly for each cartridge 100. As a result, the communication efficiency and communication accuracy in the information transmission/reception with respect to the RFID circuit element To can be assuredly improved.

Particularly, in this embodiment, in the cartridge 100, since the antenna 305 is arranged at a position substantially in parallel with the feeding path of the base tape 101 and close to the feeding path, the communication distance with the tag antenna 152 can be stably made small and efficient and reliable information transmission/reception with the targeted RFID circuit element To can be performed assuredly. If the antenna 305 is arranged close to the feeding-out position of the base tape 101 in the first roll 102, since a straight line dimension toward the downstream side in the transport direction can be taken relatively large, the substantially parallel arrangement of the antenna 305 with the tape feeding path can be realized more easily and the above effect can be obtained easily.

Particularly, in this embodiment, since power is supplied from the side of the apparatus 2 for producing RFID label to the side of the cartridge 100 through mechanical coupling between the connectors 200A, 200B, reliable and assured power supply can be realized.

The present invention is not limited to the above embodiment but capable of various variations in a range not departing from its gist and technical idea. The variations will be sequentially described below.

(1) When power is supplied from the side of the apparatus main body to the cartridge antenna without using a connector:

FIG. 16 is a sectional diagram for illustrating power supply device in this variation and equivalent to FIG. 4 in the above embodiment. In FIG. 16, the same reference numerals are given to portions equivalent to those in FIG. 4 of the above embodiment and description will be omitted as appropriate.

In this variation, a relay antenna 202A (cartridge power-supply antenna) as cartridge power-supply device is installed inside the side wall 100A1 of the housing 100A in the cartridge 100, and a relay antenna 202B (apparatus power-supply antenna) as apparatus power-supply device is installed inside the opposing side wall of the apparatus main body 8 corresponding thereto. The relay antenna 202A is connected to the loop antenna 305, while the relay antenna 202B is connected to the transmitting circuit 306 and the receiving circuit 307 (See FIG. 3) of the apparatus main body 8. The apparatus main body 8 supplies power to the loop antenna 305 through the contactless relay antennas 202B and 202A (by HF wave, for example) and accesses (for reading/writing) the RFID circuit element To by magnetic induction through the loop antenna 305.

According to this variation, since power is configured to be supplied from the side of the apparatus 2 for producing RFID label to the side of the cartridge 100 through the contactless coupling between the relay antennas 202A, 202B, smooth power supply without abrasion or damage such as in mechanical coupling between the connectors can be realized.

(2) When microstrip antenna is used:

FIG. 17 is a conceptual block diagram illustrating a detailed structure of an apparatus for producing RFID label of this variation and FIG. 18 is an explanatory diagram for illustrating a detailed structure of the cartridge and they correspond to the above-mentioned FIGS. 2 and 3, respectively. The same reference numerals are given to the members equivalent to those in FIGS. 2 and 3 and description thereof will be omitted or simplified as appropriate.

In FIGS. 17 and 18, in this variation, as the antenna of the cartridge 100 to be attached to the apparatus main body 8 in the apparatus 2 for producing RFID label, a microstrip antenna 14 that transmits/receives a signal via radio communication with the RFID circuit element To provided at the tag label tape 110 with print (details will be described later) using a radio frequency such as a UHF band (Ultra High Frequency band) and the like is provided.

That is, the micro strip antenna 14 is configured as a directional antenna (planar antenna in this example or in more detail, so-called planar patch antenna) provided with directivity to one side (front side on the face in FIG. 17 in this example), and specifically, this is an antenna in a structure provided with a microstrip antenna element inside the apparatus and a ground plate on the surface side. In addition, the antenna 14 is located close to the feeding path in a plane (orthogonal plane in this example; however, not limited to that, a crossing angle may be 45°, 60° and the like other than 90°) crossing a tape face of the feeding path of the base tape 101 fed out of the first roll 102 in the cartridge 100 (between the fed-out position of the first roll 102 to the tape feeding roller 107), and the ground plate is located on the side of the cartridge holder portion 19 of the apparatus main body 8 in the housing 100A of the cartridge 100 (See FIG. 19, which will be described later). Similarly to the antenna 305 in the above embodiment, the antenna 14 is also connected to the connector 200A of the cartridge power-supply device installed facing the side wall 100A1, and by attaching the cartridge 100 to the cartridge holder portion 19 of the apparatus main body 8, the connector 200A is connected to the connector 200B of the power-supply device on the side of the apparatus main body provided at a corresponding position.

On the other hand, instead of the transmitting circuit 306 and the receiving circuit 307 in FIG. 2, a radio frequency circuit 21 (command information creating device) that accesses (for reading or writing) the RFID circuit element To provided on the base tape 101 through the antenna 14 and a signal processing circuit 22 that processes a signal read out of the RFID circuit element To are provided.

FIG. 19 is a sectional diagram by B-BI section in FIG. 17, showing a state where the cartridge 100 is attached to the cartridge holder portion 19 of the apparatus main body 8.

In FIG. 19, the housing 100A of the cartridge 100 is formed with a thickness according to the tape width of the base tape 101 provided therein, and the thickness of the housing 100A is formed larger when the tape width of the base tape 101 is large (36 mm, for example) rather than when it is small (24 mm, for example). Usually, the RFID circuit element To is arranged at a predetermined position (center in the width direction in this example) in the tape width direction of the base tape 101, and a distance Lo from the center position of the tag antenna 152 to a bottom face 92 of the cartridge holder portion 19 is different depending on the width of the base tape 101.

FIG. 20 is a functional block diagram illustrating a detailed function of the radio frequency circuit 21. In FIG. 20, the radio frequency circuit 21 is configured by a transmitting portion 32 that transmits a signal to the RFID circuit element To through the antenna 14, a receiving portion 33 to which a reflected wave from the RFID circuit element To received by the antenna 14 is input, and a transmit-receive splitter 34. The transmit-receive splitter 34 is connected to the antenna 14.

The transmitting portion 32 includes a crystal oscillator 35 configured to generate a carrier wave for accessing (for reading or writing) the RFID tag information stored in the IC circuit part 151 of the RFID circuit element To, a PLL (Phase Locked Loop) 36 and a VCO (Voltage Controlled Oscillator) 37 that generate a signal with a predetermined frequency by control of the control circuit 30, a transmission multiplying circuit 38 (however, it may be replaced by an amplitude factor variable amplifier or the like in the case of amplitude modulation) that modulates (in this case, amplitude modulation according to the "TX_ASK" signal supplied from the signal processing circuit 22) the carrier wave generated as described above according to a signal supplied from the signal processing circuit 22, and a variable transmission amplifier 39 that amplifies the modulated waves modulated by the transmission multiplying circuit 38 with an amplification factor determined according to a "TX_PWR" signal supplied from the control circuit 30. The UHF band or microwave band is preferably used for the carrier wave generated as described above and the output from the transmission amplifier 39 is transmitted to the antenna 14 through the transmit-receive splitter 34 and is supplied to the IC circuit part 151 of the RFID circuit element To.

The receiving portion 33 includes a first receiving signal multiplying circuit 40 that multiplies the reflected wave received from the RFID circuit element To through the antenna 14 by the carrier wave generated as described above, a first bandpass filter 41 that extracts only the signals within the necessary band range from the output of the first receiving signal multiplying circuit 40, a first receiving signal amplifier 43 that amplifies the output from the first bandpass filter 41 and supplies it to a first limiter 42, a second receiving signal multiplying circuit 44 that multiplies the reflected wave received from the RFID circuit element To through the antenna 14 by the carrier wave that is delayed by a phase shifter 49 by 90° after having been generated as described above, a second bandpass filter 45 that extracts only the signals within the necessary band range from the output of the second receiving signal multiplying circuit 44, and a second receiving signal amplifier 47 to which an output of the second bandpass filter 45 is input and that amplifies and supplies the output to the second limiter 46. A signal "RXS-I" output from the first limiter 42 and a signal "RXS-Q" output from the second limiter 46 are input to the signal processing circuit 22 for processing.

Further, the outputs from the first receiving signal amplifier 43 and the second receiving signal amplifier 47 are input to a RSSI (Received Signal Strength Indicator) circuit 48. A signal "RSSI" indicating the intensity of these signals is input to the signal processing circuit 22. As mentioned above, the apparatus 2 for producing RFID label of this variation performs demodulation of the reflected wave from the RFID circuit element To by I-Q quadrature demodulation.

Further, as shown in FIG. 21, on the base tape 101, the RFID circuit element To corresponding to the UHF band having the tag antenna 152, which is a dipole antenna, and the IC circuit part 151 connected thereto is arranged.

In this variation, since the cartridge 100 is provided with the microstrip antenna 14 provided with a microstrip antenna element and a ground plate, information transmission/reception can be performed with the targeted RFID circuit element To using the directivity to the antenna element side, by which the same effect as the above embodiment is obtained.

(3) When a part of the microstrip antenna is configured by cartridge housing:

In the above variation (2), the microstrip antenna 14 is, as mentioned above, configured in a structure provided with a microstrip antenna element inside the apparatus and a ground plate on the surface side, but the housing 100A of the cartridge 100 may be used at the same time for a part of the structure. FIG. 22 is a sectional diagram illustrating such antenna structure according to this variation.

In FIG. 22, the ground plate 14a of the antenna 14 is provided on the side in the housing 100A of the cartridge 100 to be attached to the apparatus for producing RFID label, that is, on the side (outside) of the holder portion 19, while the microstrip antenna element 14b is provided on the side (inside) opposite the ground plate 14a in the housing 10A. That is because the housing 100A of the cartridge 100 is usually made of plastic and functions as a dielectric body and the microstrip antenna 14 can be configured such that the ground plate 14a and the antenna element 14b sandwich the housing 10A.

According to this variation, since the ground plate 14a of the microstrip antenna 14 is provided outside the housing 100A of the cartridge 100 and the antenna element 14B inside the housing 10A, the directivity to the side of the antenna element 14B is directed to the inside of the housing 10A, that is, toward the side of the RFID circuit element To provided at the base tape 100, which is the RFID tag medium, by which efficient information transmission/reception can be performed assuredly. In addition, the size of the cartridge structure can be reduced more than a case where the antenna 14 is provided separately from the cartridge.

(4) When loop coil antenna and microstrip antenna are switched in use:

In the above embodiment and variations, the type in which the cartridge 100 attached to the apparatus main body 8 in the apparatus 2 for producing RFID label is provided with the loop coil antenna 305 as shown in FIG. 2 and a UHF band electromagnetic wave, for example, is used for transmission/reception and the type in which the microstrip antenna 14 as shown in FIG. 17 is provided and an HF band electromagnetic wave, for example, is used for transmission/reception have been described, but they can be switched in use.

That is, though not shown, a plurality of creating circuits by frequency such as a UHF transmitting/receiving circuit and an HF transmitting/receiving circuit that create command information with frequencies different from each other and a switch (selective connecting device) that selectively connects the plurality of creating circuits by frequency to a connector (apparatus power-supply device) may be provided in the radio frequency circuit 21 in the above-mentioned FIG. 20.

With this arrangement, even if the cartridge 100 corresponding to various frequencies is replaced and attached to the cartridge holder portion 19, the optimal creating circuit by frequency corresponding to the frequency of the RFID circuit element To in each cartridge can be selected and used, and as a result, information transmission/reception with the RFID circuit element To can be assuredly executed with any cartridge.

(5) When cartridge antenna is provided detachable:

In the above, both the antennas 305, 14 on the side of the cartridge 100 are fixedly installed at the cartridge 100, but not limited to that, the antenna may be detachably installed to the cartridge 100. By installing the cartridge antenna detachable with respect to the cartridge 100, the antenna can be removed from the cartridge 100 after use and reused (for recycling).

(6) When the cartridge antenna is made movable toward the tape:

FIG. 23 is a conceptual block diagram illustrating entire outline configuration of the apparatus for producing RFID label of this variation and equivalent to FIG. 2. In FIG. 23, in this variation, a spring 304 as urging device is provided at the antenna 305 of the cartridge 100 attached to the apparatus main body 8 in the apparatus 2 for producing RFID label so that the antenna 305 is pressed onto the base tape 101, which is a tag medium, by the spring 304 all the time.

As a result, a communication distance between the antenna 305 and the RFID circuit element To can be kept at a predetermined constant value, and the communication efficiency and communication accuracy can be further improved.

(7) Others:

In the above, the case where writing/reading and printing of the RFID tag information to the base tape 101 while being moved was shown, but not limited to that, it may be so configured that the base tape 101 and the like is stopped at a predetermined position (or may be brought into a state held by a predetermined feeding guide further for reading/writing) for the printing and reading/writing.

In the above, the case where the tag label tape 110 with print for which printing and an access (for reading or writing) to the RFID circuit element To have been finished is cut by the cutter 15 so as to produce the RFID label T has been described as an example, but not limited to that. That is, if a label mount (so-called die cut label) separated in advance to a predetermined size corresponding to a label is continuously arranged on a tape fed out of a roll, it may be so configured that only the label mount (provided with the accessed RFID circuit element To and on which the corresponding print has been made) is peeled off the tape so as to produce the RFID label T after the tape is discharged from the carry-out exit 16 even without cutting the tape by the cutter 15, and the present invention can be also applied to such configuration.

In the above, such a method was used in which a print is made on the cover film 103 separate from the base tape 101 provided with the RFID circuit element To and they are bonded together, but not limited to that, the present invention may be applied to a method that a print is made to a print-receiving tape layer provided at the tag tape (non-bonding method). Moreover, the present invention is not limited to those in which the RFID tag information is read out or written in from the IC circuit part 151 of the RFID circuit element To and print to identify the RFID circuit element To is made by the print head 10. The print does not necessarily have to be made, and the present invention may be applied to those in which only reading or writing of the RFID tag information is carried out.

Moreover, in the above, such an example was explained in which the tag tape is wound around a reel member so as to constitute a roll, and the roll is arranged in the cartridge 100 and the tag tape is fed out, but not limited to that. For example, a lengthy flat-sheet state or strip-state tape or sheet (including those formed by cutting into an appropriate length a tape wound around a roll after the tape is fed out) on which at least one RFID circuit element To is arranged is stacked in a predetermined storage portion (flatly laminated in a tray-like container, for example) to be integrated into a cartridge, and this cartridge is attached to a cartridge holder on the side of the apparatus 2 for producing RFID label so that the tape is transferred and transported from the storage portion and printed and written so as to produce the RFID label.

Moreover, there may be a configuration that the roll is directly and detachably attached to the side of the apparatus 2 for producing RFID label or a configuration that the lengthy flat-sheet state or strip state tape or sheet is transferred from outside the apparatus 2 for producing RFID label one by one by a predetermined feeder mechanism and supplied into the apparatus for producing RFID label. Moreover, not limited to those detachably attached to the main body side of the apparatus 2 for producing RFID label such as a cartridge 100, the first roll 102 may be provided on the side of the apparatus main body in a so-called installed or integrated type not capable of detachment. In this case, too, the same effect is obtained.

The "Scroll ID" signal, the "Ping" signal, the "Erase" signal, the "Verify" signal, the "Program" signal and the like used in the above shall comply with the specification formulated by EPC global. The EPC global is a non-profit corporation jointly established by International EAN Association, which is an international organization of distribution codes, and UCC (Uniformed Code Council), which is an U.S. distribution code organization. Signals complying with other standards will do as long as they serve the same functions.

Other than those mentioned above, methods of the embodiments and each variation may be combined as appropriate for use.

Though not specifically exemplified, the present invention should be put into practice with various changes made in a range not departing from its gist.

What is claimed is:

1. A cartridge for including at least a RFID tag configured detachably to an apparatus for communicating with a RFID tag, comprising:
    a tag medium including a RFID circuit element having an IC circuit part configured to store information and a tag antenna configured to perform information transmission/reception;
    a cartridge antenna configured to perform information transmission/reception via radio communication with said RFID circuit element; and
    a cartridge power-supply device configured to supply power to said cartridge antenna from an apparatus power-supply device provided at said apparatus for communicating with a RFID tag.

2. The cartridge for including at least a RFID tag according to claim 1, wherein:
    said cartridge antenna is a microstrip antenna provided with a microstrip antenna element on one side and a ground plate on the other side.

3. The cartridge for including at least a RFID tag according to claim 2, further comprising a housing constituting a profile, wherein:
said ground plate is provided on a side in said housing to be attached to said apparatus for communicating with a RFID tag as said one side; and
said microstrip antenna element is provided on a side in said housing opposite said ground plate as said the other side.

4. The cartridge for including at least a RFID tag according to claim 1, wherein:
said cartridge antenna is a cartridge loop antenna configured to perform information transmission/reception by magnetic induction with said RFID circuit element.

5. The cartridge for including at least a RFID tag according to claim 4, wherein:
said cartridge loop antenna is located in the vicinity of a feeding path of said tag medium.

6. The cartridge for including at least a RFID tag according to claim 5, further comprising a roll of a tape with RFID tags configured by winding a tag tape as said tag medium on which a plurality of said RFID circuit elements are arranged continuously, wherein:
said cartridge loop antenna is arranged in the vicinity of a feeding-out portion of said tag tape in said roll of a tape with RFID tags so that the cartridge loop antenna is in parallel with a tag loop antenna provided as said tag antenna at said RFID circuit element of said tag tape.

7. The cartridge for including at least a RFID tag according to claim 6, wherein:
said tag loop antenna is formed on said tag tape by printing.

8. The cartridge for including at least a RFID tag according to claim 6, wherein:
a dimension of said tag loop antenna along a transport direction of said tag tape is set larger than a value obtained by adding a dimension of said cartridge loop antenna along said transport direction of said tag tape to a product of a communication time between said cartridge loop antenna and said RFID circuit element and a feeding velocity of said tag tape.

9. The cartridge for including at least a RFID tag according to claim 1, wherein:
said cartridge antenna is configured as an antenna unit detachable with respect to the cartridge.

10. The cartridge for including at least a RFID tag according to claim 1, wherein:
said cartridge power-supply device is a cartridge connector configured to be able to feed power by connection with an apparatus connector as said apparatus power-supply device.

11. The cartridge for including at least a RFID tag according to claim 1, wherein:
said cartridge power-supply device is a cartridge power-supply antenna configured to be able to supply power contactlessly from an apparatus power-supply antenna as said apparatus power-supply device.

12. The cartridge for including at least a RFID tag according to claim 1, wherein:
said cartridge antenna is arranged movably in a direction crossing the transport direction of said tag medium.

13. An apparatus for communicating with a RFID tag comprising:
a cartridge holder detachable with respect to a cartridge for including at least a RFID tag, having a tag medium provided with a RFID circuit element having an IC circuit part storing information and a tag antenna for information transmission/reception, a cartridge antenna configured to transmit/receive information via radio communication with said RFID circuit element, and a cartridge power-supply device configured to supply power to said cartridge antenna;
a feeding device configured to feed said tag medium; and
an apparatus power-supply device configured to supply power to said cartridge power-supply device.

14. An apparatus for communicating with a RFID tag according to claim 13, further comprising a command information creating device connected to said apparatus power-supply device and configured to create command information for an access to said IC circuit part of said RFID circuit element.

15. An apparatus for communicating with a RFID tag according to claim 14, wherein:
said command information creating device includes:
a plurality of creating circuits by frequency configured to create said command information with frequencies different from each other; and
selective connecting device configured to selectively connect said plurality of creating circuits by frequency to said apparatus power-supply device.

* * * * *